(12) United States Patent
Hwang et al.

(10) Patent No.: US 9,578,467 B2
(45) Date of Patent: *Feb. 21, 2017

(54) METHOD AND APPARATUS FOR TRANSMITTING/RECEIVING ACCESS INFORMATION OF BROADCAST SERVICE IN A BROADCASTING SYSTEM, AND SYSTEM THEREOF

(71) Applicant: Samsung Electronics Co., Ltd., Suwon-si (KR)

(72) Inventors: Sung-Oh Hwang, Gyeonggi-do (KR); Bo-Sun Jung, Gyeonggi-do (KR); Kook-Heui Lee, Gyeonggi-do (KR); Jai-Yong Lee, Seoul (KR); Byung-Rae Lee, Seoul (KR); Jong-Hyo Lee, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 115 days.

This patent is subject to a terminal disclaimer.

(21) Appl. No.: 14/579,456

(22) Filed: Dec. 22, 2014

(65) Prior Publication Data

US 2015/0103729 A1 Apr. 16, 2015

Related U.S. Application Data

(63) Continuation of application No. 11/502,619, filed on Aug. 11, 2006, now Pat. No. 8,917,706.

(30) Foreign Application Priority Data

Aug. 11, 2005 (KR) .................. 10-2005-0074011
Aug. 12, 2005 (KR) .................. 10-2005-0074534
Jul. 7, 2006 (KR) .................. 10-2006-0064116

(51) Int. Cl.
*H04W 4/06* (2009.01)
*H04H 20/93* (2008.01)
(Continued)

(52) U.S. Cl.
CPC ............... *H04W 4/06* (2013.01); *H04H 20/86* (2013.01); *H04H 20/93* (2013.01); *H04L 12/189* (2013.01);
(Continued)

(58) Field of Classification Search
None
See application file for complete search history.

(56) References Cited

U.S. PATENT DOCUMENTS 6,466,552 B1 10/2002 Haumont
6,711,623 B1 3/2004 Furukawa et al.
(Continued)

FOREIGN PATENT DOCUMENTS

EP 1562322 A1 8/2005
EP 1753166 A2 2/2007
(Continued)

OTHER PUBLICATIONS

Open Mobile Alliance, "Service Guide for Mobile Broadcast Services, Draft Version 1.0", Aug. 5, 2005, pp. 1-49, Open Mobile Alliance Ltd.
(Continued)

*Primary Examiner* — Eunsook Choi
(74) *Attorney, Agent, or Firm* — Jefferson IP Law, LLP

(57) ABSTRACT

A broadcasting system for providing access information of a broadcast service, wherein a transmission apparatus generates the access information for at least one of a broadcast network and an interaction network, from which the broadcast service is transmitted, and transmits the access information to a terminal via a specific communication network.
(Continued)

A reception apparatus receives the access information of the broadcast service via the communication network, analyzes the received access information to determine a network from which the broadcast service is provided, among the broadcast network and the interaction network, and sets an access address for reception of the broadcast service.

46 Claims, 7 Drawing Sheets

(51) Int. Cl.
| | | |
|---|---|---|
| H04L 12/18 | (2006.01) | |
| H04W 72/00 | (2009.01) | |
| H04H 20/86 | (2008.01) | |
| H04W 4/12 | (2009.01) | |
| H04H 20/82 | (2008.01) | |
| H04H 60/73 | (2008.01) | |
| H04H 60/91 | (2008.01) | |
| H04W 80/10 | (2009.01) | |

(52) U.S. Cl.
CPC ............ *H04L 12/1877* (2013.01); *H04W 4/12* (2013.01); *H04W 72/005* (2013.01); *H04H 20/82* (2013.01); *H04H 60/73* (2013.01); *H04H 60/91* (2013.01); *H04H 2201/33* (2013.01); *H04W 80/10* (2013.01)

(56) References Cited

U.S. PATENT DOCUMENTS

| | | | | |
|---|---|---|---|---|
| 6,853,680 | B1* | 2/2005 | Nikolich | ............. H04L 12/2697 375/222 |
| 7,356,029 | B2* | 4/2008 | Kaku | ...................... H04L 12/18 370/390 |
| 7,609,670 | B2* | 10/2009 | Strutt | .................... H04W 99/00 370/328 |
| 8,000,288 | B2* | 8/2011 | Wheeler | .................. H04L 1/16 370/328 |
| 2002/0141591 | A1 | 10/2002 | Hawkes et al. | |
| 2005/0070277 | A1 | 3/2005 | Hu | |
| 2005/0089013 | A1* | 4/2005 | Okagawa | ............ H04L 12/1881 370/351 |
| 2006/0018319 | A1 | 1/2006 | Palin et al. | |
| 2006/0072530 | A1* | 4/2006 | Strutt | .................... H04W 99/00 370/338 |
| 2007/0061844 | A1* | 3/2007 | Hakusui | .................. H04N 7/16 725/62 |
| 2007/0206530 | A1 | 9/2007 | Lee et al. | |
| 2009/0222871 | A1* | 9/2009 | Schaefer | ................ H04N 7/173 725/114 |

FOREIGN PATENT DOCUMENTS

| | | |
|---|---|---|
| RU | 2192095 C2 | 10/2002 |
| RU | 2233034 C2 | 7/2004 |
| WO | 02080449 A1 | 10/2002 |
| WO | 02080609 A1 | 10/2002 |
| WO | 03045064 A1 | 3/2003 |
| WO | 2007018415 A1 | 2/2007 |

OTHER PUBLICATIONS

3rd Generation Partnership Project, "3rd Generation Partnership Project; Technical Specification Group Services and System Aspects; Multimedia Broadcast/ Multicast Service (MBMS); Architecture and Functional Description (Release 6)", Dec. 2004, pp. 1-44, 3rd Generation Partnership Project.

3rd Generation Partnership Project, "3rd Generation Partnership Project; Technical Specification Group Services and System Aspects; Multimedia Broadcast/Multicast Service; Protocols and Codecs (Release 6)", Sep. 1, 2004, pp. 1-31, Release 6 (3GPP TS 26.346 V1.0.0), 3GPP Organizational Partners.

Handley, M. et al., "SDP: Session Description Protocol", Apr. 1998, pp. 1-42, RFC 2327, The Internet Society (Network Working Group).

* cited by examiner

METHOD AND APPARATUS FOR TRANSMITTING/RECEIVING ACCESS INFORMATION OF BROADCAST SERVICE IN A BROADCASTING SYSTEM, AND SYSTEM THEREOF

CROSS-REFERENCE TO RELATED APPLICATIONS

This application is a continuation of U.S. patent application Ser. No. 11/502,619, filed on Aug. 11, 2006, and claims the benefit under 35 U.S.C. §119(a) of Korean Patent Application No. 10-2005-0074011 entitled "Method and Apparatus for Transmitting/Receiving Access Information of Broadcast Service in a Broadcasting System, and System thereof", filed in the Korean Intellectual Property Office on Aug. 11, 2005, Korean Patent Application No. 10-2005-0074534 entitled "Method and Apparatus for Transmitting/Receiving Access Information of Broadcast Service in a Broadcasting System, and System thereof", filed in the Korean Intellectual Property Office on Aug. 12, 2005, and Korean Patent Application No. 10-2006-0064116 entitled "Method and Apparatus for Transmitting/Receiving Access Information of Broadcast Service in a Broadcasting System, and System thereof", filed in the Korean Intellectual Property Office on Jul. 7, 2006, the entire disclosures of all of said prior applications being hereby incorporated by reference.

BACKGROUND OF THE INVENTION

Field of the Invention

The present invention relates generally to a method and apparatus for providing broadcast services in a broadcasting system. In particular, the present invention relates to an access information transmission/reception method and apparatus for efficiently achieving access to broadcast services, and a system and terminal thereof.

Description of the Related Art

The mobile communication market continuously requires production of new services through for example, the recombination or integration of existing technologies. Today, with the development of communication and broadcast technologies, the conventional broadcasting system or mobile communication system has reached the phase of providing broadcast services through portable terminals (or mobile terminals), such as mobile phones and personal digital assistants (PDAs). Due to the latent and actual market needs and the increasing demand for multimedia services, the service providers' intended strategies for providing new services such as broadcast service in addition to the existing voice service, and the identified interests of Information Technology (IT) companies which are bolstering their mobile communication businesses to meet the user's demands, convergence of the mobile communication service and the Internet Protocol (IP) has become the mainstream of development of the next generation mobile communication technologies.

The Open Mobile Alliance (OMA), one of the standardization groups for broadcast services, was established in June, 2002, by about 200 companies including Nokia, NTT and IBM, to perform research on the standard for interworking between individual mobile solutions. The OMA mainly serves to define various application standards for mobile games and Internet services. Of the working groups belonging to the OMA, the Open Mobile Alliance Browser and Content Mobile Broadcast Sub Working Group (OMA BAC BCAST) is now performing research on the technology for providing broadcast services using mobile terminals. A brief description will now be made of the broadcasting system which is under discussion in the OMA.

In a BCAST system, which is a broadcasting system proposed by the OMA, a mobile terminal desiring to receive a broadcast service should receive so-called service guide information containing description information for the service, billing information for the service, and information on a receiving method for the service. The mobile terminal receives the service according to the information provided through the service guide information. A description will now be made of the conventional broadcast service access method with reference to the BCAST system as an example of the general broadcasting system using the service guide. FIG. 1 is a block diagram illustrating a structure of a service guide used for receiving broadcast services in a general broadcasting system. This structure is proposed to provide broadcast services to the mobile terminal in the BCAST system. One service guide is comprised of a plurality of groups each having its own purpose, and all the groups are classified into four groups according to use, as shown in FIG. 1. FIG. 1 illustrates an exemplary service guide comprised of an administrative group 100, a provisioning group 110, a core group 120, and an access group 130.

The administrative group 100 is a group for providing basic information needed by a mobile terminal to receive a service guide and includes a service guide context fragment 101 and a service guide delivery descriptor fragment 102. The service guide context fragment 101 provides a service guide identifier (ID), identification information of the service provider that generated and transmitted the service guide, and the entire information on the service guide. The service guide delivery descriptor fragment 102 provides a channel capable of receiving fragments for a plurality of service guides, scheduling information, and update information to a mobile terminal so that the mobile terminal may receive only the necessary service guide at an appropriate time.

The provisioning group 110 is a group for providing fee information for service reception and includes a purchase item fragment 111, a purchase data fragment 112, and a purchase channel fragment 113. The purchase item fragment 111 provides fee information for a service or a service bundle, the purchase data fragment 112 provides information indicating how a service user can pay the fee, and the purchase channel fragment 113 provides information on the system where the service user can actually purchase the service.

The core group 120 is a group for providing information on the service itself and includes a service fragment 121, a schedule fragment 122, and a content fragment 123. The service fragment 121 provides a description of the service itself that the user will receive, and also provides information indicating with which content the service can be configured. The schedule fragment 122 provides information on the time at which the service can be provided and used. The content fragment 123 provides information on a plurality of contents constituting the service.

The access group 130 includes an access fragment 131 and a session description fragment 132, and provides service access information indicating how to receive the services provided through the core group 120, and detailed information on the session in which the contents constituting the corresponding service are transmitted, so as to allow the mobile terminal to access the corresponding service. The access fragment 131 provides a plurality of access methods for one service to the mobile terminal, thereby providing a method capable of accessing various additional services based on one service. The session description fragment 132 provides session information for the service defined in one access fragment.

The service guide information, as shown in FIG. 1, can further include a preview data fragment 124 that provides a preview and icon for the service and content in addition to the foregoing four fragments.

With reference to Table 1 to Table 7 below, a description will now be made of the details of the access fragment defined in the conventional OMA BCAST by way of example. Table 1 to Table 7 are divided from one table, for convenience, and a definition of items in each table follows the definition of Table 1.

TABLE 1

|  | Name | Type | Category | Cardinality | Description | Data Type |
|---|---|---|---|---|---|---|
| 201 | Access | E | O | 0 ... N | Access fragment Contains the following attributes: id version validFrom validTo ServiceProtection AccessType AudioLanguage Contains the following sub-elements: ExtensionURL AccessType ServiceID UsageInfo SessionDescriptionURI SDP InteractiveAccessURL TerminalCapabilityRequirement BandwidthRequirement ApplicationSpec MediaInformation | |

In Table 1, a first item "Name" indicates names of attributes or elements of an access fragment, and a second item "Type" indicates whether each object included in the access fragment corresponds to Attribute (A) or Element (E). As to a difference between the attribute and the element, the attribute is a value indicating an attribute of an access fragment and its element, and the element is a value indicating the information actually used. A third item "Category" indicates whether the attribute or element is a mandatory value (M) or an optional value (O). A fourth item "Cardinality" indicates whether the attribute or element is repeated, and a fifth item "Description" indicates a description of the attribute or element. Finally, a sixth item "Data Type" indicates a data type of the attribute or element.

In Table 1, reference numeral 201 indicates what the attribute or element included in the access fragment comprises.

TABLE 2

| 202 | id | A | M | 1 | ID of the Access fragment. | Integer |
|---|---|---|---|---|---|---|
| 203 | version | A | M | 1 | Version of this fragment. The newer version overrides the older one as soon as it has been received. | Byte (8 bits) |
| 204 | validFrom | A | O | 0 ... 1 | The first moment when this fragment is valid. If not given, the validity is assumed to have started at some time in the past. | Integer (32 bits), expressed as NTP time. |
| 205 | validTo | A | O | 0 ... 1 | The last moment when this fragment is valid. If not given, the validity is assumed to end in an undefined time in the future. | Integer (32 bits), expressed as NTP time. |
| 206 | ServiceProtection | A | O | 0 ... 1 | If true, this indicates that this service is protected; if false, this indicates that this service is free to air. | Boolean |

In Table 2, reference numeral 202 denotes an identifier of the access fragment, and this is an attribute for enabling a mobile terminal to uniquely identify a corresponding access fragment when it refers to the corresponding access fragment in other fragments. Reference numeral 203 denotes an attribute indicating a version of the access fragment, and enables indication of whether the mobile terminal has received an access fragment of the same version or an access fragment of a new version.

The "validFrom" attribute denoted by reference numeral 204 and "validTo" denoted by reference numeral 205 are attributes indicating a valid period of the information included in the access fragment, and "ServiceProtection" denoted by reference numeral 206 is an attribute indicating whether there is a need for a separate authentication procedure during access, as the service that can be accessed through information of the access fragment is service-protected.

TABLE 3

| 207 | AccessType | A | M | 1 | Defines the type of access Possible values:<br>1. Default access object; has to exist for A/V streaming services (such as TV radio etc). It is used as default in case of multiple accesses, associated SDP needed;<br>2. Alternated access object, associated SDP needed;<br>3. File carousel, to be used for scheduled file download and file carousel type of services; associated SDP needed;<br>4. File download to be used for file download over interaction network; associated AccessURI needed;<br>5. Service_SMS; this type of access is used for creation of various SMS-based services (voting, etc); no associated SDP;<br>6. Service_web_local; this type of access is used for pointing to locally stored web pages; no associated SDP;<br>7. Service_web; this type of access is used for pointing to internet services; no associated SDP;<br>8. Service_voice_call; this type of access is used for making a phone call;<br>9. Service_MMS; this type of access is used for creating various MMS-based services (voting, etc); no associated SDP; and<br>10. Service_java_app; this type of access is used for launching Java applications. | Integer (8 bits) |

In Table 3, "AccessType" denoted by reference numeral 207 is an attribute indicating in which method the mobile terminal capable of receiving broadcast service can receive the broadcast service that provides access information in the access fragment, and 10 Access Types are currently defined. Therefore, it is undesirably necessary to newly define Access Type every time a service of a new type occurs.

TABLE 4

| 208 | AudioLanguage | A | O | 0 ... N | The language of the Audio Stream. | 3-byte ISO 639 language code |
|---|---|---|---|---|---|---|
| 209 | ExtensionURL | E1 | O | 0 ... N | URL containing additional information in an extension fragment. | AnyURI |
| 210 | ServiceID | E1 | M | 1 ... N | Reference to the service fragment(s) to which the access fragment belongs. | Integer |
| 211 | UsageInfo | E1 | O | 0 ... N | This text helps the user understand what difference it makes to use one or the other access fragment. It is mandatory in case more than one access fragment is available at a given point in time.<br>Possibly provided in multiple languages.<br>Attributes:<br>Lang | |
| 212 | Lang | A | O | 0 ... 1 | Language | 3-byte ISO 639 language code |

In Table 4, "AudioLanguage" denoted by reference numeral 208 is used to indicate a language of an audio stream transmitted through the access fragment, and "ExtensionURL" denoted by reference numeral 209 is used to indicate an address of an extended fragment. The "ServiceID" denoted by reference numeral 210 is an element indicating an identifier of the service that can be accessed through information of the access fragment, and "UsageInfo" denoted by reference numeral 211 is an element that provides information capable of indicating the usage and correlation of a plurality of corresponding access fragments for users when there are multiple access fragments capable of providing various access information so as to receive various types of additional services for one service, and provides an attribute "Lang" denoted by reference numeral 212 so that it can be provided in various languages.

TABLE 5

| 213 | AccessURI | E1 | O | 0 . . . 1 | The URI to the SG delivery unit(s) which contain the session description that the media application in the terminal uses to access the service. In case of non-broadcast service, AccessURI contains information how that particular service can be accessed. Attribute: Type Note; Using either AccessURI or SDP is mandatory. | AnyURI |
|---|---|---|---|---|---|---|
| 214 | Type | A | M | 1 | Type of the AccessURI: 1 - SDP; AccessURI is a reference to SDP description; 2 - MBMS-USD; AccessURI is a reference to MBMS user service description (MEMS-USD) as specified in [26.346] section 5.2. It may contain one or several SDP descriptions. | Integer |
| 215 | SDP | E1 | O | 0 . . . 1 | A session description in SDP (IFTF session description protocol) format. | String (in SDP format) |
| 216 | Interactive AccessURL | E1 | O | 0 . . . N | Specify alternative URL of the content for retrieving it via the interaction channel if the content cannot be received via the broadcast channel. | AnyURI |

In Table 5, "AccessURI" denoted by reference numeral 213 is an element indicating an address of the place where information on the session in which the service indicated by the access fragment is transmitted can be acquired, and has, for example, an attribute "Type" denoted by reference numeral 214. The Type 214 is an attribute indicating the type of session information and supports a Session Description Protocol (SDP) type, which is a protocol of the current IEFT, and a session information type used in Multimedia Broadcast Multicast Service (MBMS), which is portable broadcast technology specified by the asynchronous mobile communication standardization group. The "SDP" 215 is an element providing information on actual session description, and "InteractiveAccessURL" 216 is an element notifying an address so that a mobile terminal can receive the service through an interaction channel.

TABLE 6

| 217 | TerminalCapabilityRequirement | E1 | O | 0 . . . 1 | Specification of required terminal capabilities, such as protocols, codecs, bit rate, and processing memory; UAprof is used for expressing the capabilities. | String |
|---|---|---|---|---|---|---|
| 218 | BandwidthRequirement | E1 | O | 0 . . . 1 | Specification of required network bandwidth. A broadcast service can include multiple accessible streams (same content) with different bandwidth, so that the terminal can make a choice depending on its current reception condition. | Integer |
| 219 | ApplicationSpec | E1 | O | 0 . . . N | Application type that can consume the service using this access spec defined by MIME type. | String |

In Table 6, "TerminalCapabilityRequirement" denoted by reference numeral 217 is an element indicating the software and hardware requirements of a mobile terminal for receiving the service that can be accessed through information of the access fragment, and based on this, a mobile terminal having a portable broadcast receiving function can determine whether it has the capability of receiving the corresponding service. In addition, "BandwidthRequirement" denoted by reference numeral 218 is an element indicating a data rate in a wireless environment of the service that can be accessed through the access fragment, and enables selection of the data rate required by the mobile terminal among several data rates, and reception of the service at the selected data rate. The "ApplicationSpec" 219 is an element providing separate information capable of receiving the service defined in MIME type.

TABLE 7

| 220 | MediaInformation | E1 | O | 0 ... N | Optional reference to an icon, pictogramme, animation or audio. PreviewData or reference to PreviewData is used here. Attributes: usage id | |
|---|---|---|---|---|---|---|
| 221 | usage | A | M | 1 | Possible values; background, icon(e.g.). | Integer (8 bits) |
| 222 | id | A | M | 1 | ID of the PreviewData fragment. | Integer (8 bits) |
| 223 | <proprietary elements/attributes> | E1 or lower. A | O | 0 ... N | Any number of proprietary or application-specific elements or attributes that are not defined in this specification. | |

In Table 7, "MediaInformation" denoted by reference numeral 220 is an element providing preview information of the service indicated by the access fragment by the mobile terminal that received the access fragment, and has an attribute "usage" 221 and an attribute "id" 222. The attribute "usage" indicates whether it will use information of the fragment associated with the attribute "id" as preview information or background information. Reference numeral 223 denotes an element or attribute capable of providing other information that is not provided through the access fragment.

The access fragment of the conventional BCAST system, shown in Table 1 to Table 7, has the following problems.

First, because "AccessType" conceptually defines Access Type for an actual service in Table 3, Access Type should be newly defined every time a new service occurs. Second, most broadcast services provided to the mobile terminal are multimedia services requiring a high data rate, and should efficiently use radio resources in order to support high-speed transmission. Therefore, most broadcast technologies for the mobile terminal introduce the multicast concept used in the Internet Protocol, and support a method for enabling the service only in the place where the user is located. However, this method is not currently supported for the Access Type. Third, in the currently proposed broadcasting system, there is no method for simply providing to the mobile terminal a transmission scheme or transmission topology supported in the broadcasting system for access to the broadcast service.

Accordingly, a need exists for a system and method for efficiently transmitting/receiving access information of broadcast services in a broadcasting system.

SUMMARY OF THE INVENTION

Embodiments of the present invention are provided to substantially solve the above and other problems, and provide a method and apparatus for efficiently transmitting/receiving access information of broadcast services in a broadcasting system, and a system thereof.

Further, embodiments of the present invention provide a method and apparatus for transmitting/receiving access information of a broadcast network or an interaction network via which broadcast services are transmitted in a broadcasting system, and a system thereof.

Further, embodiments of the present invention provide a method and apparatus for transmitting/receiving an access fragment including access information of broadcast services in an IP-based broadcasting system, and a system thereof.

Moreover, embodiments of the present invention provide an access fragment format for efficiently providing access information for broadcast services in a broadcasting system.

According to one aspect of embodiments of the present invention, a method is provided for transmitting access information of a broadcast service in a transmitter of a broadcasting system. The method comprises the steps of generating access information for at least one of a broadcast network and an interaction network, via which broadcast service is transmitted, and transmitting the access information to a terminal via a specific communication network.

According to another aspect of embodiments of the present invention, an apparatus is provided for transmitting access information of a broadcast service in a transmitter of a broadcasting system. The apparatus comprises an access information generator for generating access information for at least one of a broadcast network and an interaction network, via which broadcast service is transmitted, and a transmitter for transmitting the access information to a terminal via a specific communication network.

According to another aspect of embodiments of the present invention, a method is provided for receiving access information of a broadcast service in a terminal of a broadcasting system. The method comprises the steps of receiving, via a specific communication network, access information for at least one of a broadcast network and an interaction network, from which broadcast service is transmitted, and receiving the broadcast service from the at least one of the broadcast network and the interaction network according to the received access information.

According to yet another aspect of embodiments of the present invention, an apparatus is provided for receiving access information of a broadcast service in a terminal of a broadcasting system. The apparatus comprises a receiver for receiving, via a specific communication network, access information for at least one of a broadcast network and an interaction network from which broadcast service is transmitted and receiving the broadcast service from the at least one of the broadcast network and the interaction network according to the received access information.

According to still another aspect of embodiments of the present invention, a broadcasting system is provided for providing access information of a broadcast service. The system comprises a transmission apparatus for generating access information for at least one of a broadcast network and an interaction network, from which broadcast service is transmitted, and transmitting the access information to a terminal via a specific communication network, and a reception apparatus for receiving, via a specific communication network, the access information of the broadcast service and receiving the broadcast service from the at least one of the broadcast network and the interaction network according to the received access information.

BRIEF DESCRIPTION OF THE DRAWINGS

The above and other objects, features and advantages of embodiments of the present invention will become more apparent from the following detailed description when taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
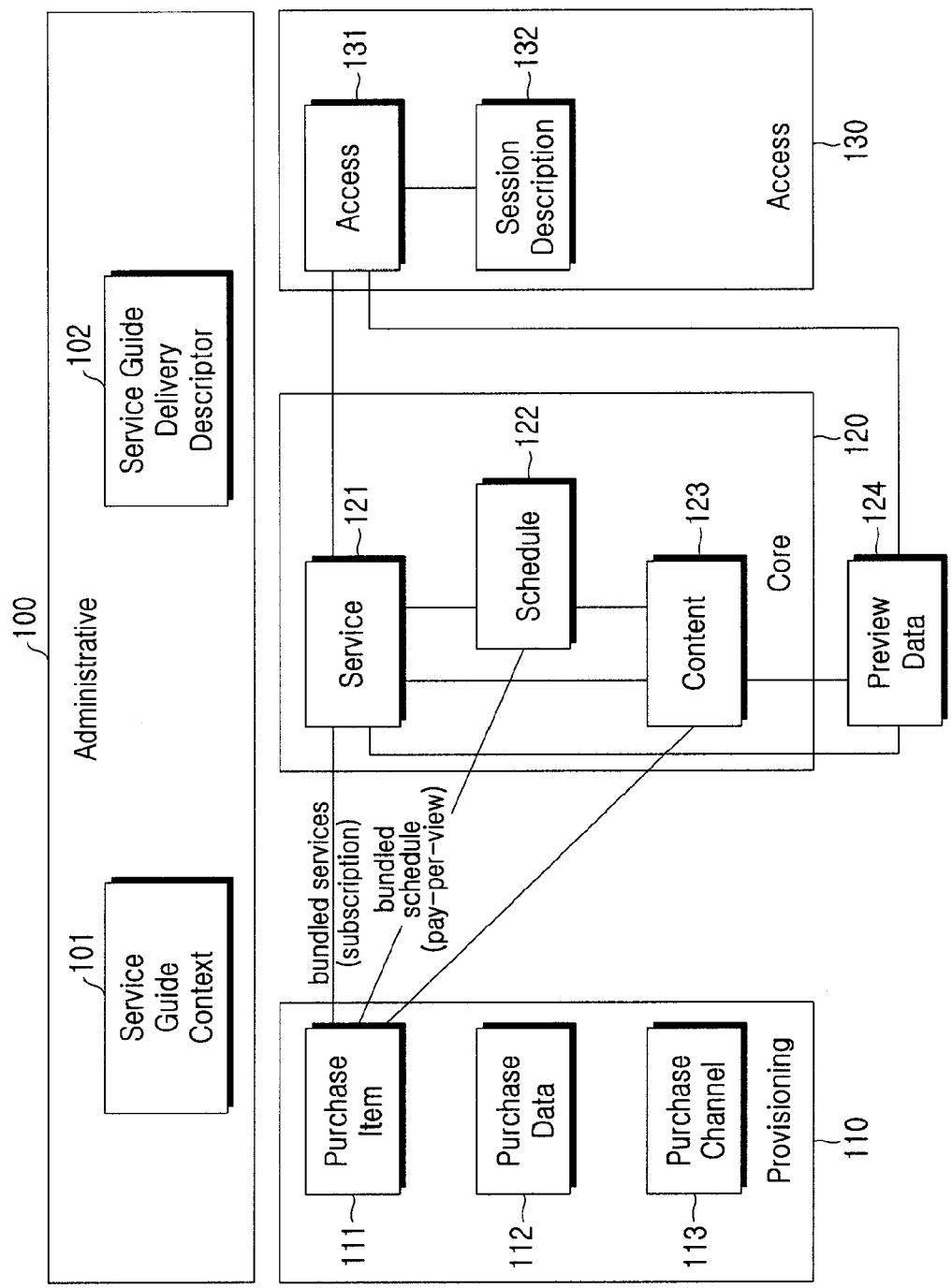
FIG. 1 is a block diagram illustrating a structure of a service guide used for receiving broadcast services in a general broadcasting system.

Exemplary embodiments of the present invention will now be described in detail with reference to the annexed drawings. In the following description, a detailed description of known functions and configurations incorporated herein has been omitted for clarity and conciseness.

In the following description, exemplary embodiments of the present invention will be presented to accomplish the above and other objects. Although the exemplary embodiments will be described based on the BCAST system, which is one of many portable broadcast technology standards, embodiments of the present invention are not limited thereto, and the following descriptions are not provided to restrict the possible scope of the present invention. In this specification, it should be construed that the broadcasting system comprises various communication systems supporting IP-based broadcast services, such as the BCAST system and the DVB-H system. In addition, although a receiver of the BCAST system will herein be described as a mobile terminal for convenience, embodiments of the present invention are not limited thereto, and it would be obvious to those skilled in the art that the technical spirit of the present invention can also be applied to wired communication systems supporting IP-based broadcast services.

Although the term "service guide" will be used herein as the information including, for example, relevant description and receiving method for the broadcast service of the BCAST system, and "access fragment" will be used herein as the information including an access method of broadcast services, the terms "service guide" and "access fragment" are subject to change according to type of corresponding broadcasting system.

The present invention provides a number of embodiments, including the exemplary first to third embodiments described below. In the first exemplary embodiment, the BCAST system proposes a new access fragment efficiently configured to indicate an access method for a specific service in service guide information that the mobile terminal receives to receive the service. In the first embodiment, the access fragment is configured such that it includes only the attribute related to the service access. Further, in the first embodiment, the access fragment is configured to indicate whether the service is transmitted over a broadcast channel or an interaction channel of the mobile communication network, without individually configuring "AccessType" providing access information of the service for each service as shown in Table 3.

The second exemplary embodiment proposes an efficient access fragment format in which information of the same access fragment can be used for a plurality of different services. Finally, the third exemplary embodiment proposes another embodiment capable of simply providing access information for service transmission through the broadcast network and service transmission through the interaction network using the access fragment. In addition, it should be noted that the first to third embodiments show various types of exemplary access fragment formats, and commonly include features of the present invention of providing the detailed access information of the broadcast network and the interaction network via which the services are transmitted.

Herein, the first exemplary embodiment will be described with reference to Table 8 to Table 14, the second exemplary embodiment will be described with reference to Table 15 to Table 18, and the third exemplary embodiment will be described with reference to Table 19 to Table 37. Although operations of a transmission apparatus of FIG. 2 and a reception apparatus of FIG. 4 will be described based on the first embodiment for convenience, structures of the apparatuses of FIGS. 2 and 4 can also be applied to the second, third, and other embodiments.

First Exemplary Embodiment

Table 8 to Table 14 show by way of example, a format of an access fragment according to the first exemplary embodiment of the present invention. Table 8 to Table 14 are divided from one table, for convenience, and a definition of items in each table follows the definition of Table 8. In addition, the definition of each item in Table 8 to Table 14 is substantially equal to the definition of Table 1, and a detailed description of the same parts throughout Table 1 to Table 7, and Table 8 to Table 14, will be omitted.

TABLE 8

| | Name | Type | Category | Cardinality | Description | Data Type |
|---|---|---|---|---|---|---|
| 301 | Access | E | O | 0 ... N | Access fragment Contains the following attributes: id version validFrom validTo Contains the following sub-elements: ServiceID UsageInfo SessionDescriptionURI SDP ApplicationSpec MediaInformation | |
| 302 | Id | A | M | 1 | ID of the Access fragment. | Integer |
| 303 | version | A | M | 1 | Version of this fragment. The newer version overrides the older one as soon as it has been received. | Byte (8 bits) |
| 304 | validFrom | A | O | 0 ... 1 | The first moment when this fragment is valid. If not given, the validity is assumed to have started at some time in the past. | Integer (32 bits), expressed as NTP time. |

An access fragment of the first embodiment comprises attributes of "Id" 302, "version" 303 and "validFrom" 304 in Table 8, and "validTo" 305 in Table 9. These four attributes represent unique attributes for the access fragment, and their functions are substantially equal to those of the attributes having the same names in Table 2. However, as to the difference between the conventional access fragment described in Table 2 and the access fragment proposed in embodiments of the present invention, the conventional access fragment has, as attributes, even the values not associated with the attributes of the access fragment, whereas the proposed access fragment is configured such that it has only the attributes associated with the access fragment, and has changed the other attributes to the elements matched to the corresponding characteristics.

The access fragment of the first embodiment, as presented in Table 8, comprises "ServiceID" 306 in Table 9, and "UsageInfo" 319, "SessionDescriptionURI" 321, "SDP" 323, "ApplicationSpec" 324 and "MediaInformation" 325 in Table 12 to Table 14, as sub-elements.

TABLE 9

| | | | | | | |
|---|---|---|---|---|---|---|
| 305 | validTo | A | O | 0 ... 1 | The last moment when this fragment is valid. If not given, the validity is assumed to end in an undefined time in the future. | Integer (32 bits), expressed as NTP time. |
| 306 | ServiceID | E1 | M | 1 ... N | Reference to the service fragment(s) to which the access fragment belongs. Contains the following Attribute: ServiceProtection Contains the following elements: TerminalCapabilityRequirement BandwidthRequirement AccessType | |
| 307 | ServiceProtection | A | M | 0 ... 1 | "1" indicates that this service is protected, "0" indicates that this service is free to air. | Boolean |
| 308 | TerminalCapabilityRequirement | E2 | O | 0 ... 1 | Specification of required terminal capabilities, such as protocols, codecs, bit rate, processing, and memory. UAprof is used for expressing the capabilities. | String |

In Table 9, "ServiceID" denoted by reference numeral 306 is a service identifier with which a mobile terminal can obtain access information of a service through the access fragment, and has "ServiceProtection" 307 as its attribute. The "ServiceID" has "TerminalCapabilityRequirement" 308 in Table 9, and "BandwidthRequriement" 309 and "AccessType" 310 in Table 10, as its sub-elements. Therefore, in the first embodiment, because the element "ServiceID" has all access information of the service, being coincident with the corresponding service, the proposed access fragment has higher efficiency than the conventional access fragment in terms of the format.

The "TerminalCapabilityRequriement" 308 in Table 9 and "BandwidthRequriement" 309 in Table 10 have substantially the same functions as those of the conventional access fragment.

the broadcast channel or is provided from a communication network capable of bidirectional communication, and a type of the sub-element that can be included in the "AccessType" is determined according to a value of the attribute. For example, if the "TransmissionMedia" indicates that the service is transmitted over the broadcast channel, "AccessType" comprises "Transmission_Topology" 313 in Table 10 and "IP_Address" 314 in Table 11, as its sub-elements.

The "Transmission_Topology" in Table 10 is an element indicating whether the service transmitted over the broadcast channel will be transmitted in a broadcast mode or a multicast mode. The broadcast mode and the multicast mode are used in Internet Protocol, and if the "Transmission_Topology" indicates the broadcast mode, it means that the service is transmitted to a particular area regardless of the

TABLE 10

| 309 | BandwidthRequirement | E2 | O | 0 . . . 1 | Specification of required network bandwidth; A broadcast service can include multiple accessible streams (same content) with different bandwidth, so that the terminal can make a choice depending on its current reception condition. | Integer |
|---|---|---|---|---|---|---|
| 310 | AccessType | E2 | M | 1 | Defines the type of access. Possible values; Contains the following Attributes: TransmissionMedia Contains the following elements: TransmissionTopology TransmissionScheme | String |
| 312 | Transmission_Media | A | M | 1 | 0: Broadcast channel 1: Interaction channel | ENUM |
| 313 | Transmission_Topology | E3 | O | 0 . . . 1 | 0: Broadcast Mode 1: Multicast Mode Contains the following attributes: IP_Address | ENUM |

The "AccessType" 310 in Table 10, provided to indicate in which method the mobile terminal can receive the service, is used to indicate whether the service is transmitted over the broadcast channel or transmitted over the interaction channel provided in the mobile communication network, and also indicate with which protocol or system the mobile terminal transmits the service. For this purpose, in the first embodiment, the "AccessType" is comprised of one attribute and two sub-elements.

That is, "Transmission_Media" 312 in Table 10 is an attribute indicating whether the service is transmitted over position of the service recipient. If the "Transmission_Topology" indicates the multicast mode, it means that the service is transmitted to the place where the service recipient is located in the serviceable area according to location information of the service recipient. In addition, when the "Transmission_Topology" indicates the multicast mode, the mobile terminal capable of receiving the broadcast service preferably should make a subscription application to an IP address of the multicast mode and receive the broadcast service.

TABLE 11

| 314 | IP_Address | A | O | 0 . . . 1 | IP address of IP stream, which transport A Service over Broadcast channel. If Transmission Topology is 0, then Type of IP address is IP Broadcast address. If Transmission Topology is 1, then Type of IP address is IP Broadcast address. | String |
|---|---|---|---|---|---|---|
| 315 | Transmission_Scheme | E3 | O | 0 . . . 1 | 1: Interaction Channel provided by Interaction Network 2: MMS 3: WAP 1.0 4: WAP 2 x 5: SMS 6: HTTP 7: Service Provider defined Transmission Scheme | ENUM |

TABLE 11-continued

| 316 | AccessServerIPAddress | E4 | O | 0 . . . N | IP address of Sever, which provides different access (over interaction Channel) of a Service. | String |
| --- | --- | --- | --- | --- | --- | --- |
| 317 | AccessServerURL | E4 | O | 0 . . . N | ULR of Server, which provides different access (over Interaction Channel) of a Service. | AnyURI |
| 318 | AccessServerPhoneNumber | E4 | O | 0 . . . N | Phone number of Server, which provides different access (over Interaction Channel) of a Service. | |

The "IP_Address" 314 in Table 11, because the service is transmitted to mobile terminals in the form of IP flow in the BCAST system, is an attribute indicating an address for the IP flow. The "IP_Address" becomes an IP broadcast address or an IP multicast address according to a value of the "Transmission_Topology" in Table 10. Commonly, an IP address of the service is indicated in the session description. However, when the session description is not transmitted together with the access fragment, it should be provided to the mobile terminal for identification of the service on the IP level.

If the attribute "Transmission_Media" 312 in Table 10 indicates Interaction Channel, "Transmission_Scheme" 315 in Table 11 is included in the "AccessType" of Table 10, and the "Transmission_Scheme" comprises "AccessServerIPAddress" 316, "AccessServerURL" 317, and "AccessServerPhoneNumber" 318 as its sub-elements.

The "Transmission_Scheme" is an element indicating the communication system or protocol used in the interaction channel, when it is possible to access the service through the interaction channel. Although OMA BCAST currently specifies, for example, Web Browsing, Multimedia Messaging Service (MMS), Wireless Application Protocol 1.0 (WAP1.0), Wireless Application Protocol 2.x (WAP 2.x), Short Messaging Service (SMS), and Hyper Text Transmission Protocol (HTTP) as the communication systems or protocols that can be used for the interaction channel, further communication systems and protocols that can be used for the interaction channel can be added in the future.

In Table 11, "AccessServerIPAddress" 316, "AccessServerURL" 317, and "AccessServerPhoneNumber" 318 are elements indicating an address of the server that provides the service over the interaction channel in order to indicate whether the mobile terminal receiving the access fragment can access the service through the interaction channel in any place. Because an addressing system used in each communication system or protocol is different, the representative addressing system of the communication system and protocol, currently adapted to support the interaction channel, is presented.

The "AccessServerIPAddress" 316 is an element indicating a position of the server based on Internet Protocol, the "AccessServerURL" 317 is an element indicating a position of the server that uses the communication system or protocol supporting Web or URL, and the "AccessServerPhoneNumber" 318 is an element indicating a position of the server that enables access to the service using MMS or SMS. Further, in embodiments of the present invention, a new communication system or protocol is added to the "Transmission_Scheme" 315 in Table 11, and if the addressing system of the communication system or protocol is different from the currently provided one, a new addressing system can be added as a sub-element of the "Transmission_Scheme".

TABLE 12

| 319 | UsageInfo | E1 | O | 0 . . . N | The text explains the characteristic of this access fragment for a User. This text also contains the information about other Access fragments of a Service if there exists more than 1 Access fragment. Possibly provided in multiple languages. Attributes: Lang | |
| --- | --- | --- | --- | --- | --- | --- |
| 320 | Lang | A | O | 0 . . . 1 | Language | 3-byte ISO 639 language code |
| 321 | SessionDescriptionURI | E1 | O | 0 . . . 1 | The URI to the SG delivery unit(s) which contains the session description that the media application in the terminal uses to access the service. In case of non-broadcast service, AccessURI contains information on how that particular service can be accessed. Contains following Attribute and element: Type Note; Using either AccessURI or SDP is mandatory. | AnyURI |

The "UsageInfo" 319 in Table 12 is an element for giving a description of the characteristic of the access fragment to the user of the mobile terminal, especially an element that can be used for describing the characteristic and correlation of each access fragment for the user even when there are a plurality of access fragments for one service, providing sub-services having different characteristics. The "Usage-Info" has "Lang" 320 as an attribute.

The "SessionDescriptionURI" 321 in Table 12, and "Type" 322, "SDP" 323, "ApplicationSpec" 324, "MediaInformation" 325, "Usage" 326, "Id" 327, and "<proprietary elements/attributes>" 328 in Table 13 and Table 14, have substantially the same functions as those of the conventional access fragment, so a detailed description thereof will be omitted.

TABLE 13

| 322 | Type | A | M | 1 | Type of the AccessURI: 1 - SDP; AccessURI is a reference to SDP description; 2 - MBMS-USD; AccessURI is a reference to MBMS user service description (MBMS-USD) as specified in [26.346] section 5.2. It may contain one or several SDP descriptions. | Integer |
|---|---|---|---|---|---|---|
| 323 | SDP | E1 | O | 0 . . . 1 | A session description in SDP (IETF session description protocol) format. | String (in SDP format) |
| 324 | ApplicationSpec | E1 | O | 0 . . . N | Application type that can consume the service using this access spec defined by MIME type. | String |

TABLE 14

| 325 | MediaInformation | E1 | | O | 0 . . . N | Optional reference to an icon, pictogramme, animation or audio. PreviewData or reference to PreviewData is used here. Attributes: usage id | |
|---|---|---|---|---|---|---|---|
| 326 | Usage | A | | M | 1 | Possible values: background, icon(e.g.). | Integer (8 bits) |
| 327 | Id | A | | M | 1 | ID of the PreviewData fragment. | Integer (8 bits) |
| 328 | <proprietary elements/attributes> | E1 or lower. A | | O | 0 . . . N | Any number of proprietary or application-specific elements or attributes that are not defined in this specification. | |

With reference to FIGS. 2 to 5, a description will now be made of a structure and operation of a transmission apparatus for generating and transmitting an access fragment configured in the format of Table 7 to Table 14, and a reception apparatus for receiving the access fragment to receive a desired service.

Figure 2:
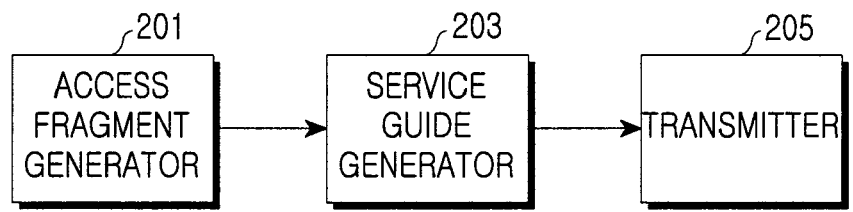
FIG. 2 is a block diagram illustrating a structure of a transmission apparatus for generating an access fragment and transmitting the access fragment to a mobile terminal in a broadcasting system according to an exemplary embodiment of the present invention.

FIG. 2 is a block diagram illustrating a structure of a transmission apparatus for generating an access fragment and transmitting the access fragment to a mobile terminal in a broadcasting system according to an exemplary embodiment of the present invention. The transmission apparatus comprises an access fragment generator 201, a service guide generator 203, and a transmitter 205.

Referring to FIG. 2, the access fragment generator 201 generates an access fragment configured in the format of Table 7 to Table 14. The service guide generator 203 generates service guide information having the structure of FIG. 1 using the access fragment output from the access fragment generator 201, and the transmitter 205 transmits the service guide information to the mobile terminal via a transmission network. The transmission network can be a network providing a broadcast channel, or a network providing an interaction channel.

The transmission apparatus of FIG. 2 can be applied to a transmitter of the BCAST system. Alternatively, the transmission apparatus can also be applied to a transmitter of any number of communication systems that provide IP-based broadcast service to a plurality of users, like the DVB-H system.

Figure 3:
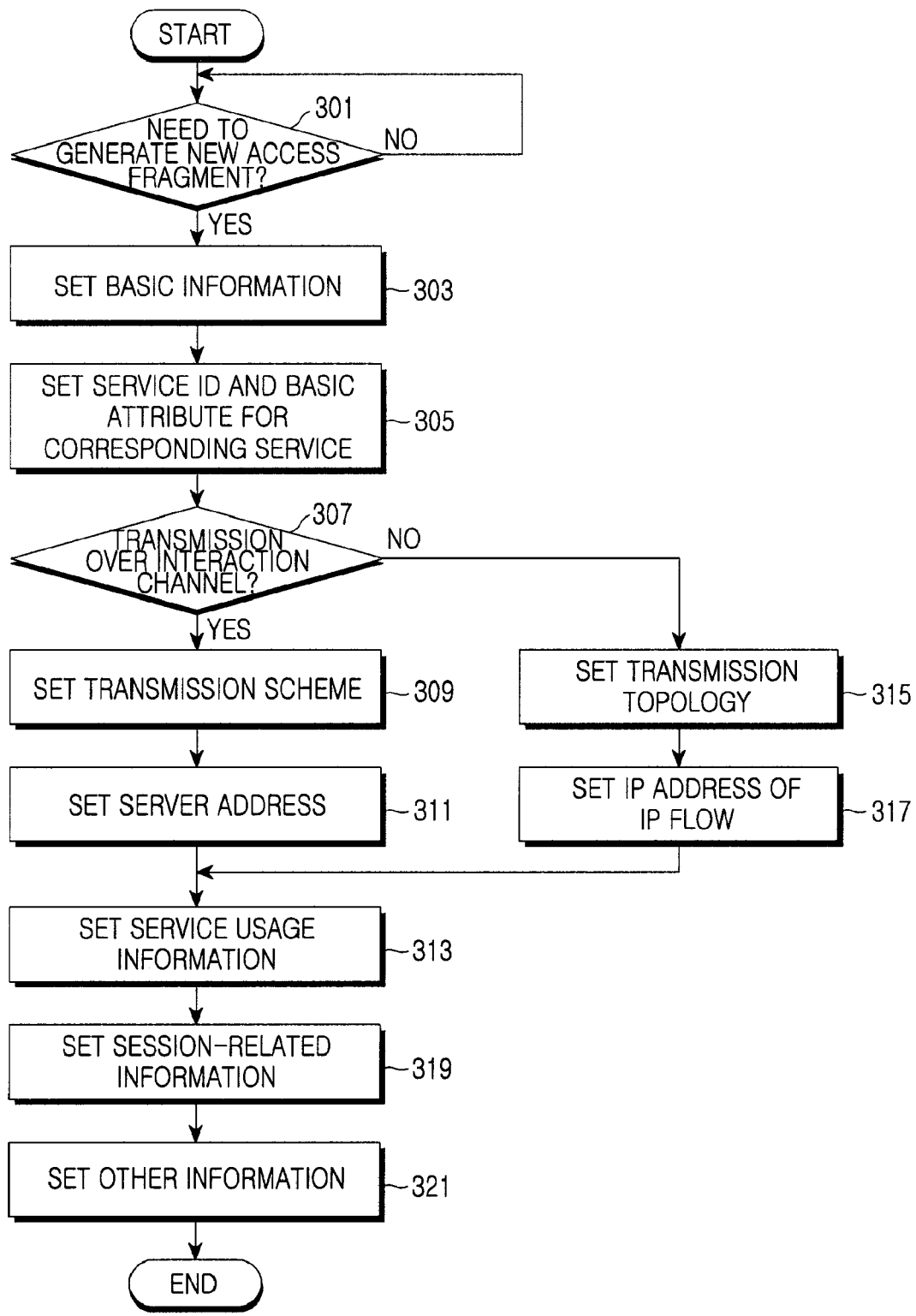
FIG. 3 is a flowchart illustrating a process of generating and transmitting an access fragment in a broadcasting system according to a first exemplary embodiment of the present invention.

FIG. 3 is a flowchart illustrating a process of generating and transmitting an access fragment in a broadcasting system according to the first exemplary embodiment of the present invention. This process corresponds to an operation of the access fragment generator 201 of FIG. 2.

Referring to FIG. 3, the access fragment generator 201 determines in step 301 whether there is a need to generate a new access fragment. If there is a need to generate a new access fragment, it means that a new service starts, or that there is a need to provide a new additional service or a new access method for the current service to a mobile terminal receiving the broadcast service. If it is determined in step 301 that there is a need to generate a new access fragment, the access fragment generator 201 sets basic information for the access fragment in step 303. The basic information comprises at least one of "Id", "version", and "validFrom" and "validTo" both related to validity of the access fragment, described in connection with Table 8 and Table 9.

In step 305, the access fragment generator 201 sets a service ID corresponding to the information provided by the access fragment, and sets a basic attribute of the service corresponding to the service ID. The basic attribute comprises at least one of information indicating whether to apply the service protection, information indicating the requirements of the mobile terminal for receiving the service, and information indicating a data rate at which the service is transmitted in a wireless environment, all of which have been described in connection with Table 9 and Table 10. In step 307, the access fragment generator 201 determines whether the service will be transmitted over a broadcast channel or an interaction channel. If the service is to be transmitted over the interaction channel, the access fragment generator 201 proceeds to step 309. However, if the service is to be transmitted over the broadcast channel, the access fragment generator 201 proceeds to step 315.

The access fragment generator 201 sets a transmission scheme for a communication system or protocol to be used, in step 309, and sets an address for the corresponding communication system or protocol in step 311. Thereafter, in step 313, the access fragment generator 201 sets service usage information "UsageInfo", and if there is characteristic description for the corresponding access fragment and a plurality of access fragments for one service, the access fragment generator 201 adds description of characteristic and correlation for each of them to the access fragment so that a broadcast service recipient may detect the difference.

In step 315, the access fragment generator 201 sets transmission topology information indicating whether the corresponding service will be transmitted in a broadcast mode or a multicast mode. The mode-related information is determined by a transmission entity or a service providing entity, and the access fragment generator 201 receives the mode-related information provided from the corresponding entity, and sets the mode depending on the mode-related information. In step 317, the access fragment generator 201 sets IP information of an IP flow where the service is transmitted. Thereafter, in step 313, the access fragment generator 201 sets service usage information "UsageInfo".

In step 319, the access fragment generator 201 sets information on the session in which the service, whose access information is provided through the corresponding access fragment, is transmitted. The session information comprises an IP address of a sender, an IP address of a recipient, a type of data transmitted through the session, and a codec used. Session Description Protocol defined by IETF is a typical example of the session information. Thereafter, in step 321, the access fragment generator 201 sets the other information constituting the access fragment, and then ends the operation.

Figure 4:
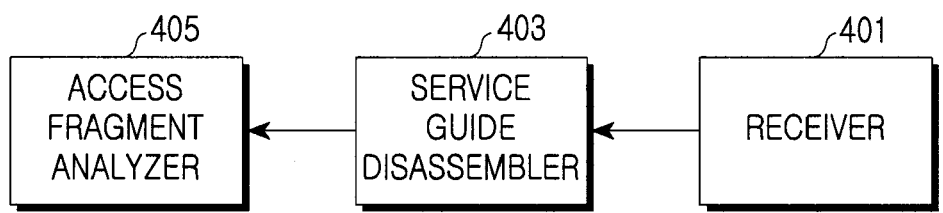
FIG. 4 is a block diagram illustrating a structure of a reception apparatus for receiving an access fragment in a broadcasting system according to an exemplary embodiment of the present invention.

FIG. 4 is a block diagram illustrating a structure of a reception apparatus for receiving a service guide containing an access fragment to receive a broadcast service in a broadcasting system according to an exemplary embodiment of the present invention. The reception apparatus comprises a receiver 401, a service guide disassembler 403, and an access fragment analyzer 405.

Referring to FIG. 4, the receiver 401 receives service guide information transmitted from the transmission apparatus of the broadcasting system via a transmission network, and outputs the received service guide information to the service guide disassembler 403. The service guide disassembler 403 extracts each fragment from the received service guide, and delivers the extracted fragment to a corresponding fragment analyzer. FIG. 4 shows only the access fragment analyzer 405 related to embodiments of the present invention, from among a plurality of possible fragment analyzers. The access fragment analyzer 405 analyzes a received access fragment having the format of Table 7 to Table 14, included in the service guide information according to an operation of FIG. 5 described below, and a mobile terminal performs an operation of receiving the service based on the analysis result.

Figure 5:
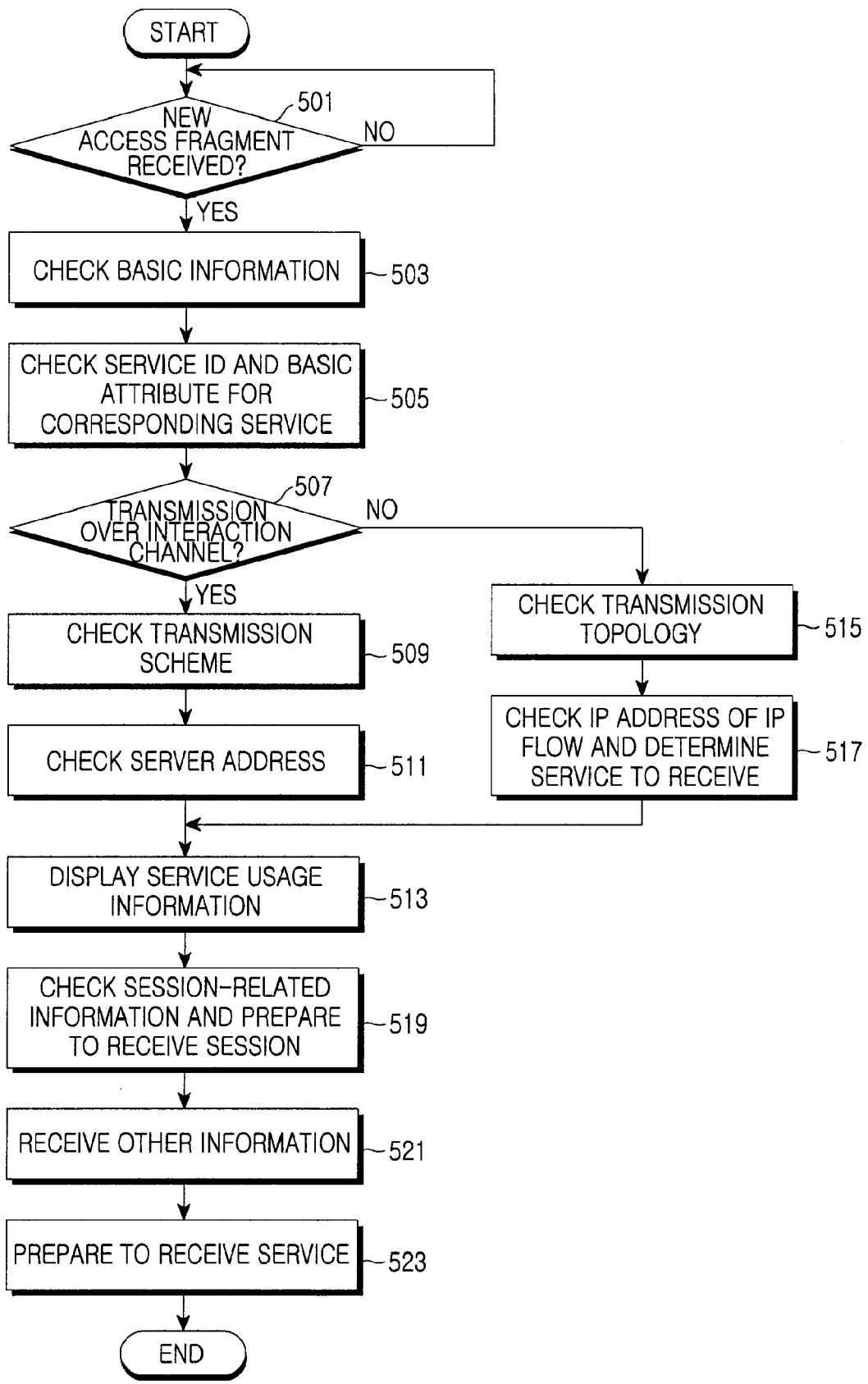
FIG. 5 is a flowchart illustrating a process of receiving and analyzing an access fragment in a broadcasting system according to the first exemplary embodiment of the present invention.

FIG. 5 is a flowchart illustrating a process of receiving and analyzing an access fragment in a broadcasting system according to the first exemplary embodiment of the present invention. This process corresponds to an operation of the access fragment analyzer 405 of FIG. 4.

Referring to FIG. 5, the access fragment analyzer 405 determines in step 501 whether there is any new access fragment received. The determination criteria is an attribute "version" of the received access fragment. If it is determined in step 501 that there is any access fragment received, the access fragment analyzer 405 analyzes, in step 503, the basic information of the access fragment, determines a valid period of the access fragment in the basic information, and recognizes that the information provided through the access fragment is valid only in the valid period.

In step 505, the access fragment analyzer 405 determines a service ID that can be accessed through access information provided by the access fragment, and determines whether the corresponding service undergoes service protection before being transmitted. When the service undergoes service protection, the access fragment analyzer 405 prepares to perform a related operation so as to correctly receive the corresponding service. In addition, the access fragment analyzer 405 checks a basic attribute for the corresponding service ID, compares a performance condition of the mobile terminal requiring the corresponding service with a performance condition of the current mobile terminal to determine whether the service is receivable, and selects an appropriate channel taking into account a bandwidth provided by the service.

In step 507, the access fragment analyzer 405 determines whether the service will be transmitted over a broadcast channel or an interaction channel based on the access information provided by the access fragment. If the service is to be transmitted over an interaction channel, the access fragment analyzer 405 proceeds to step 509. However, if the service is to be transmitted over a broadcast channel, the access fragment analyzer 405 proceeds to step 515.

In step 509, the access fragment analyzer 405 checks a transmission scheme and recognizes a communication system or protocol to be used. After recognizing that it preferably should receive the service using the determined communication system or protocol, the access fragment analyzer 405 analyzes, in step 511, an address of the server that transmits the service over the interaction channel, and prepares to transmit a service request. The addressing system may differ according to communication system and protocol using the interaction channel. Thereafter, in step 513, the access fragment analyzer 405 checks service usage information "UsageInfo", and if there is characteristic description for the access fragment and a plurality of access fragments for one service, the access fragment analyzer 405 recognizes characteristic and correlation for each of them, and the mobile terminal displays the corresponding description for the user who will receive the service so as to allow the user to make an appropriate selection.

In step 515, the access fragment analyzer 405 checks the transmission topology, analyzes the information indicating whether the service will be transmitted in the broadcast mode or the multicast mode, and prepares to perform an operation appropriate for the analysis result. For the service transmitted in the broadcast mode, the mobile terminal can receive the corresponding service without joining in the service. However, for the service transmitted in the multicast mode, the mobile terminal preferably should perform a Join process for a multicast IP address group of an IP flow where the service is transmitted, in order to receive the service.

In step 517, the access fragment analyzer 405 checks an address of the IP flow where the service is transmitted. The address of the IP flow is very important for the mobile terminal scheduled to receive the service in the process of distinguishing an IP flow where the service is transmitted. If the address of the IP flow is not provided, the mobile terminal preferably should perform an operation of receiving all IP flows transmitted through the broadcast channel and determining whether the corresponding service is a desired service, for every IP flow. The address of the IP flow is connected to a communication bearer under an IP layer and indicates which communication bearer the mobile terminal should receive in order to receive the IP flow. The method may be different in each broadcast system providing the broadcast channel and departs from the scope of the present invention, so a detailed description thereof will be omitted.

After step 513, the access fragment analyzer 405 checks, in step 519, information on the session where the service, whose access information is provided from the access fragment, is transmitted, and allows the mobile terminal to prepare to receive the session where the service is actually transmitted. Thereafter, in step 521, the access fragment analyzer 405 analyzes the other information provided from the access fragment and uses the related information for an appropriate purpose. In step 523, the access fragment analyzer 405 prepares to access and receive the service according to the information analyzed from the access fragment, and then ends the operation.

Second Exemplary Embodiment

With reference to Table 15 to Table 18 and FIGS. 6 and 7, a description will now be made of a method for transmitting/receiving an access fragment according to a second exemplary embodiment of the present invention.

Table 15 to Table 18 show by way of example, a format of an access fragment according to the second embodiment of the present invention. A difference in the access fragment between the first embodiment and the second embodiment is in that information of the same access fragment is used for a plurality of different services, and an efficient structure thereof will be proposed in the second embodiment. A definition of items in each table is substantially equal to the definition of Table 1, and a detailed description of the same parts throughout Table 15 to Table 18 and Table 8 to Table 14 will be omitted.

In addition, compared with the attributes or elements defined in Table 8 to Table 14, the unchanged parts of Table 15 to Table 18 will not be shown for simplicity.

TABLE 15

|  | Name | Type | Category | Cardinality | Description | Data Type |
|---|---|---|---|---|---|---|
| *01 | Access | E | O | 0 . . . N | Access fragment Contains the following attributes: id version validFrom validTo ServiceProtection Contains the following sub-elements: TerminalCapabilityRequirement BandwidthRequirement AccessType ServiceID ExtensionURL UsageInfo SessionDescriptionURI SDP ApplicationSpec MediaInformation | |
| *02 | Id | A | M | 1 | ID of the Access fragment. | Integer |
| *03 | version | A | M | 1 | Version of this fragment. The newer version overrides the older one as soon as it has been received. | Byte (8 bits) |
| *04 | validFrom | A | O | 0 . . . 1 | The first moment when this fragment is valid. If not given, the validity is assumed to have started at some time in the past. | Integer (32 bits), expressed as NTP time. |
| *05 | validTo | A | O | 0 . . . 1 | The last moment when this fragment is valid. If not given, the validity is assumed to end in an undefined time in the future. | Integer (32 bits), expressed as NTP time. |
| *06 | ServiceProtection | A | M | 1 | If true, this indicates that this access related to the associated service is protected by OMA BCAST Service protection; if false, this indicates this access related to the associated service is not protected by OMA BCAST Service protection. | Boolean |

In Table 15, the access fragment proposed by the second embodiment comprises attributes of "Id"*02, "version"*03, "validFrom"*04, "validTo"*05, and "ServiceProtection"*06, as specified in "Access" denoted by reference numeral *01. The five attributes represent unique attributes for the access fragment, and their functions are substantially equal to those of the attributes having the same names in Table 2. Further, the access fragment proposed in the second embodiment comprises "TerminialCapabilityRequirement"*07, "BandwidthRequirement"*08, "AccessType"*09, "ServiceID"*17, "ExtensionURL"*18, "UsageInfo"*19, "SessionDescriptionURI"*21, "SDP" *23, "ApplicationSpec"*24, and "MediaInformation"*25 as its sub-elements, as specified in the "Access"*01.

"Transmission_Media" indicates that the service is transmitted over the broadcast channel, "AccessType" comprises "Transmission_Topology"*11 and "IP_Address"*12, as its sub-elements.

The "Transmission_Topology" in Table 16 is an element indicating whether the service transmitted over the broadcast channel will be transmitted in a broadcast mode or a multicast mode. The broadcast mode and the multicast mode are used in Internet Protocol, and if the "Transmission_Topology" indicates the broadcast mode, it means that the

TABLE 16

| | | | | | | | |
|---|---|---|---|---|---|---|---|
| *07 | TerminalCapabilityRequirement | E1 | O | 0...1 | Specification of required terminal capabilities for this access, such as protocols, codecs, bit rate, processing and memory; UAprof is used for expressing the capabilities. | | String |
| *08 | BandwidthRequirement | E1 | O | 0...1 | Specification of required network bandwidth to access described in this fragment. A broadcast service can include multiple accessible streams (same content) with different bandwidth, so that the terminal can make a choice depending on its current reception condition. | | Integer |
| *09 | AccessType | E1 | M | 1 | Defines the type of access; Contains the following Attributes: TransmissionMedia Contains the following elements: TransmissionTopology TransmissionScheme | | |
| *10 | Transmission_Media | A | M | 1 | This attribute indicates which channel is used for the delivery of services, whose IDs are listed in this Access Fragment. 0: Broadcast Channel 1: Interaction Channel | | Integer |
| *11 | Transmission_Topology | E2 | O | 0...1 | This element is used for the indication of IP transmission mode over Broadcast Channel. There are two possible modes. 0: Broadcast Mode 1: Multicast Mode Contains the following Attributes: IP_Address | | Integer |
| *12 | IP_Address | A | O | 0...1 | IP address of IP stream, which transport A Service over Broadcast channel. If Transmission Topology is 0, then Type of IP address is IP Broadcast address. If Transmission Topology is 1, then Type of IP address is IP Multicast address. Note: This attribute is used when SDP is not included in Access Fragment. If SDP in Access Fragment exists, IP address of the receiver IP address in SDP is used. | | String |
| *13 | Interaction_Scheme | E2 | O | 0...1 | This element indicates which communication system or protocol is used for Interaction. | | Integer |

The "TerminalCapabilityRequirement"*07 in Table 16 indicates the requirement for the mobile terminal that accesses the service through the access fragment, and "BandwidthRequirement"*08 indicates the bandwidth in the wireless channel of the service accessed through the access fragment. The "AccessType"*09, provided to indicate in which method the mobile terminal will receive the service, is used to indicate whether the service is transmitted over the broadcast channel or transmitted over the interaction channel provided in the mobile communication network, and also indicate with which protocol or system the mobile terminal transmits the service. For this purpose, in the second embodiment, the "AccessType" is comprised of one attribute and two sub-elements.

That is, "Transmission_Media"*10 in Table 16 is an attribute indicating whether the service is transmitted over the broadcast channel or is provided from a communication network capable of bidirectional communication, and a type of the sub-element that can be included in the "AccessType" is determined according to a value of the attribute. If the service is transmitted to a particular area regardless of the position of the service recipient.

If the "Transmission_Topology" indicates the multicast mode, it means that the service is transmitted to the place where the service recipient is located in the serviceable area according to location information of the service recipient. In addition, when the "Transmission_Topology" indicates the multicast mode, the mobile terminal capable of receiving the broadcast service preferably should make a subscription application to an IP address of the multicast mode and receive the broadcast service.

The "IP_Address"*12 in Table 16, because the service is transmitted to mobile terminals in the form of IP flow in the broadcasting system, is an attribute indicating an address for the IP flow. The "IP_Address" becomes an IP broadcast address or an IP multicast address according to a value of the "Transmission_Topology". Commonly, an IP address of the service is indicated in the session description. However, when the session description is not transmitted together with the access fragment, it preferably should be provided to the mobile terminal for identification of the service on the IP level.

If the attribute "Transmission_Media"*10 in Table 16 indicates Interaction Channel, "Interaction_Scheme"*13 is included in the "AccessType" *09, and the "Interaction_Scheme" has a substantially equivalent meaning to the "Transmission_Scheme" described in the first embodiment. In the second embodiment, the "Transmission_Scheme" has "AccessServerIPAddress"*14, "AccessServerURL"*15, and "AccessServerPhoneNumber"*16 as its sub-elements.

The "Transmission_Scheme" is an element indicating the communication system or protocol used in the interaction channel, when it is possible to access the service through the interaction channel. Although OMA BCAST currently specifies, for example, Web Browsing, Multimedia Messaging Service (MMS), Wireless Application Protocol 1.0 (WAP1.0), Wireless Application Protocol 2.x (WAP 2.x), Short Messaging Service (SMS), and Hyper Text Transmission Protocol (HTTP) as the communication systems or protocols that can be used for the interaction channel, further communication systems and protocols that can be used for the interaction channel can be added in the future.

In Table 17, "AccessServerIPAddress"*14, "AccessServerURL"*15, and "AccessServerPhoneNumber"*16 are elements indicating an address of the server that provides the service over the interaction channel in order to indicate whether the mobile terminal receiving the access fragment can access the service through the interaction channel in any place. Because an addressing system used in each communication system or protocol is different, the representative addressing system of the communication system and protocol, currently adapted to support the interaction channel, is presented.

The "AccessServerIPAddress"*14 is an element indicating a position of the server based on Internet Protocol, the "AccessServerURL"*15 is an element indicating a position of the server that uses the communication system or protocol supporting Web or URL, and the "AccessServerPhoneNumber"*16 is an element indicating a position of the server that enables access to the service using MMS or SMS. Further, a new communication system or protocol is added to the "Interaction_Scheme"*13 in Table 16, and if the addressing system of the communication system or protocol is different from the one currently provided, a new addressing system can be added as a sub-element of the "Interaction_Scheme".

TABLE 17

|     |                        |    |   |       | Channel. 1: Interaction Channel provided by Interaction network 2: MMS 3: WAP 1.0 4: WAP 2 x 5: SMS 6: HTTP 7: Service Provider defined Transmission Scheme |       |
| --- | --- | --- | --- | --- | --- | --- |
| *14 | AccessServerIPAddress  | E3 | O | 0 ... N | IP address of Server, which provides different access (over interaction Channel) of a Service. | String |
| *15 | AccessServerURL        | E3 | O | 0 ... N | ULR of Server, which provides different access (over interaction Channel) of a Service. | AnyURI |
| *16 | AccessServerPhoneNumber | E3 | O | 0 ... N | Phone number of Server, which provides different access (over Interaction Channel) of a Service. | Integer |
| *17 | ServiceID              | E1 | M | 0 ... N | Reference to the service fragment(s) to which the access fragment belongs. | Integer |
| *18 | ExtensionURL           | E1 | O | 0 ... N | URL containing additional information in an extension fragment. | AnyURI |
| *19 | UsageInfo              | E1 | O | 0 ... N | This text helps the user understand what difference it makes to use one or the other access fragment. It is mandatory in case more than one access fragment is available at a given point in time. Possibly provided in multiple languages. Attributes: Lang | |
| *20 | Lang                   | A  | O | 0 ... 1 | Language | 3-byte ISO 639 language code |
| *21 | SessionDescriptionURI  | E1 | O | 0 ... 1 | The URI to the SG delivery unit(s) which contain the session description that the media application in the terminal uses to access the service. In case of non-broadcast service, SessionDescriptionURI contains information how that particular service can be accessed. Contains the following Attribute: | AnyURI |

In Table 17, "ServiceID"*17 indicates an identifier of the service that can be accessed using access information provided from the access fragment, and when a plurality of services use the same access, a plurality of the "ServiceIDs" may exist. The "UsageInfo"*19 is an element for giving a description of the characteristic of the access fragment to the user of the mobile terminal, especially an element that can be used for describing the characteristic and correlation of each access fragment for the user, even when there are a plurality of access fragments for one service, providing sub-services having different characteristics. The "UsageInfo" has "Lang"*20 as an attribute.

"validTo" both related to validity of the access fragment, "ServiceProtection" indicating whether Service Protection is applied or not, "TerminalCapabilityRequirement" indicating the requirement of the mobile terminal intending to have access to the service, and "BandwidthRequirement" indicating a data rate of the service in the wireless channel, all of which are described in connection with Table 15 and Table 16.

In step 605, the access fragment generator 201 determines whether the service that can be accessed through the corresponding access fragment will be transmitted over a broadcast channel or an interaction channel. If the service is to be

TABLE 18

| | | | | | Type Note: Using either SessionDescriptionURI or SDP is mandatory. | |
|---|---|---|---|---|---|---|
| *22 | Type | A | M | 1 | Type of the AccessURI 1 - SDP; AccessURI is a reference to SDP description; 2 - MBMS-USD; AccessURI is a reference to MBMS user service description (MBMS-USD) as specified in [26.346] section 5.2. It may contain one or several SDP descriptions. | Integer |
| *23 | SDP | E1 | O | 0 . . . 1 | A session description in SDP (IETF session description protocol) format. | String (in SDP format) |
| *24 | ApplicationSpec | E1 | O | 0 . . . N | Application type that can consume the service using this access spec defined by MIME type. | String |
| *25 | MediaInformation | E1 | O | 0 . . . N | Optional reference to an icon, pictogramme, animation or audio. PreviewData or reference to PreviewData is used here. Attributes: usage id | |
| *26 | Usage | A | M | 1 | Possible values: background, icon(e.g.). | Integer (8 bits) |
| *27 | Id | A | M | 1 | ID of the PreviewData fragment. | Integer (8 bits) |
| *28 | <proprietary elements/attributes> | E1 or lower. A | O | 0 . . . N | Any number of proprietary or application-specific elements or attributes that are not defined in this specification. | |

In Table 17 and Table 18, the "SessionDescriptionURI"*21, "Type"*22, "SDP"*23, "ApplicationSpec"*24, "MediaInformation"*25, "Usage"*26, "Id" *27, and "<proprietary elements/attributes>"*28 have substantially the same functions as those of the conventional access fragment, so a detailed description thereof will be omitted.

Figure 6:
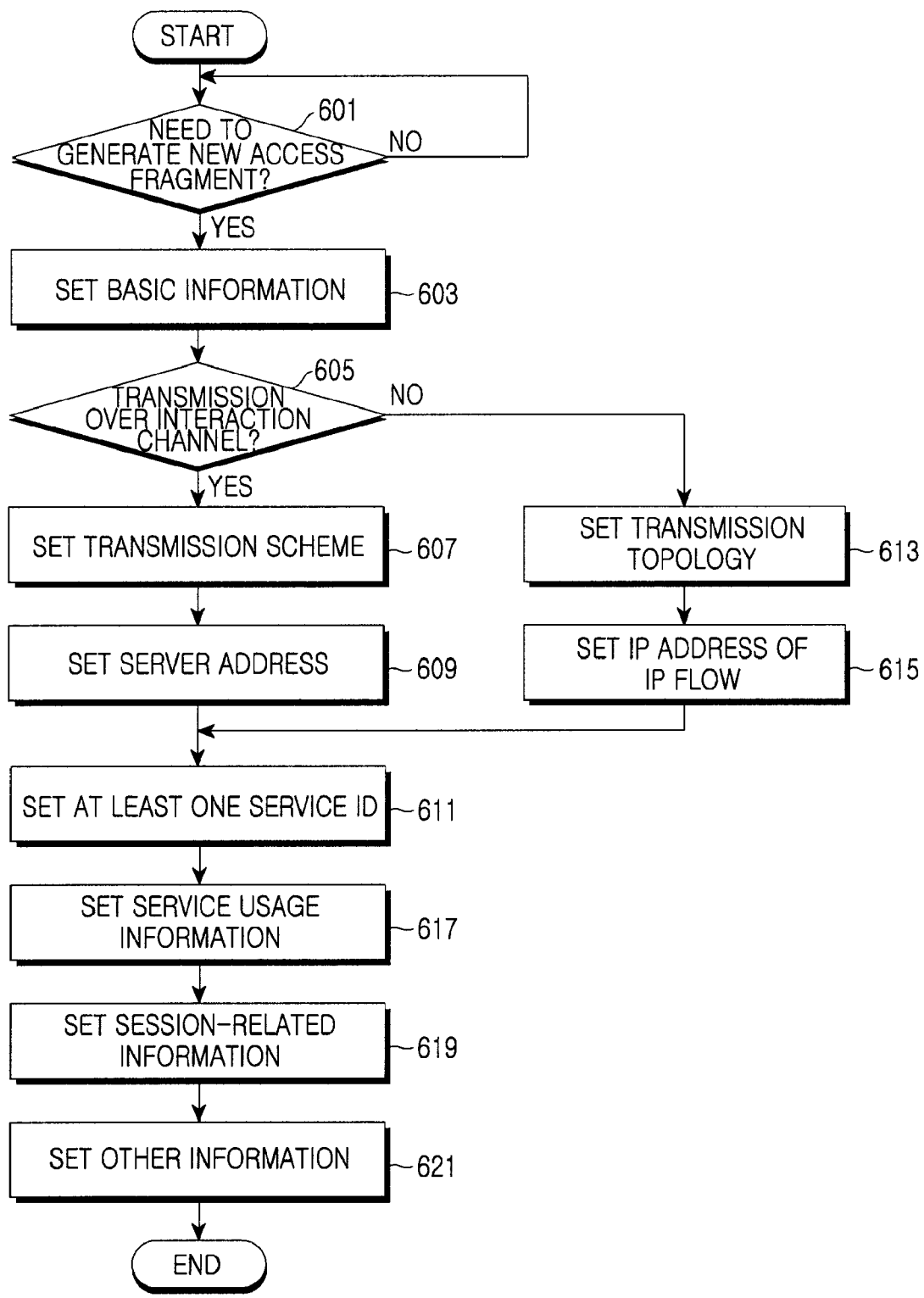
FIG. 6 is a flowchart illustrating a process of generating and transmitting an access fragment in a broadcasting system according to a second exemplary embodiment of the present invention.

FIG. 6 is a flowchart illustrating a process of generating and transmitting an access fragment in an OMA broadcasting system according to the second embodiment of the present invention. This process corresponds to an operation of the access fragment generator 201 in the transmission apparatus of FIG. 2.

Referring to FIG. 6, the access fragment generator 201 determines in step 601 whether there is a need to generate a new access fragment. If there is a need to generate a new access fragment, it means that a new service starts, or that there is a need to provide a new additional service or a new access method for the current service to a mobile terminal receiving the broadcast service. If it is determined in step 601 that there is a need to generate a new access fragment, the access fragment generator 201 sets basic information for the access fragment in step 603. The basic information comprises at least one of "Id", "version", "validFrom" and transmitted over the interaction channel, the access fragment generator 201 proceeds to step 607. However, if the service is to be transmitted over the broadcast channel, the access fragment generator 201 proceeds to step 613.

The access fragment generator 201 sets a transmission scheme for a communication system or protocol to be used, in step 607, and sets an address for the corresponding communication system or protocol in step 609. Thereafter, in step 611, the access fragment generator 201 sets at least one service ID that can be accessed with the information provided in the access fragment.

In step 613, the access fragment generator 201 sets transmission topology information indicating whether the corresponding access or the service using the access will be transmitted in a broadcast mode or a multicast mode. The mode-related information is determined by a transmission entity or a service providing entity, and the access fragment generator 201 receives the mode-related information provided from the corresponding entity, and sets the transmission topology information depending on the mode-related information. In step 615, the access fragment generator 201 sets IP information of an IP flow where the service is transmitted, and then proceeds to step 611.

Thereafter, in step 617, the access fragment generator 201 sets service usage information "UsageInfo", and if there is characteristic description for the corresponding access fragment and a plurality of access fragments for one service, the access fragment generator 201 adds description of characteristic and correlation for each of them to the access fragment so that a broadcast service recipient may detect the difference.

In step 619, the access fragment generator 201 sets information on the session in which the service, whose access information is provided through the corresponding access fragment, is transmitted. The session information comprises an IP address of a sender, an IP address of a recipient, a type of data transmitted through the session, and a codec used. Session Description Protocol defined by IETF is a typical example of the session information. Thereafter, in step 621, the access fragment generator 201 sets the other information constituting the access fragment, and then ends the operation.

Figure 7:
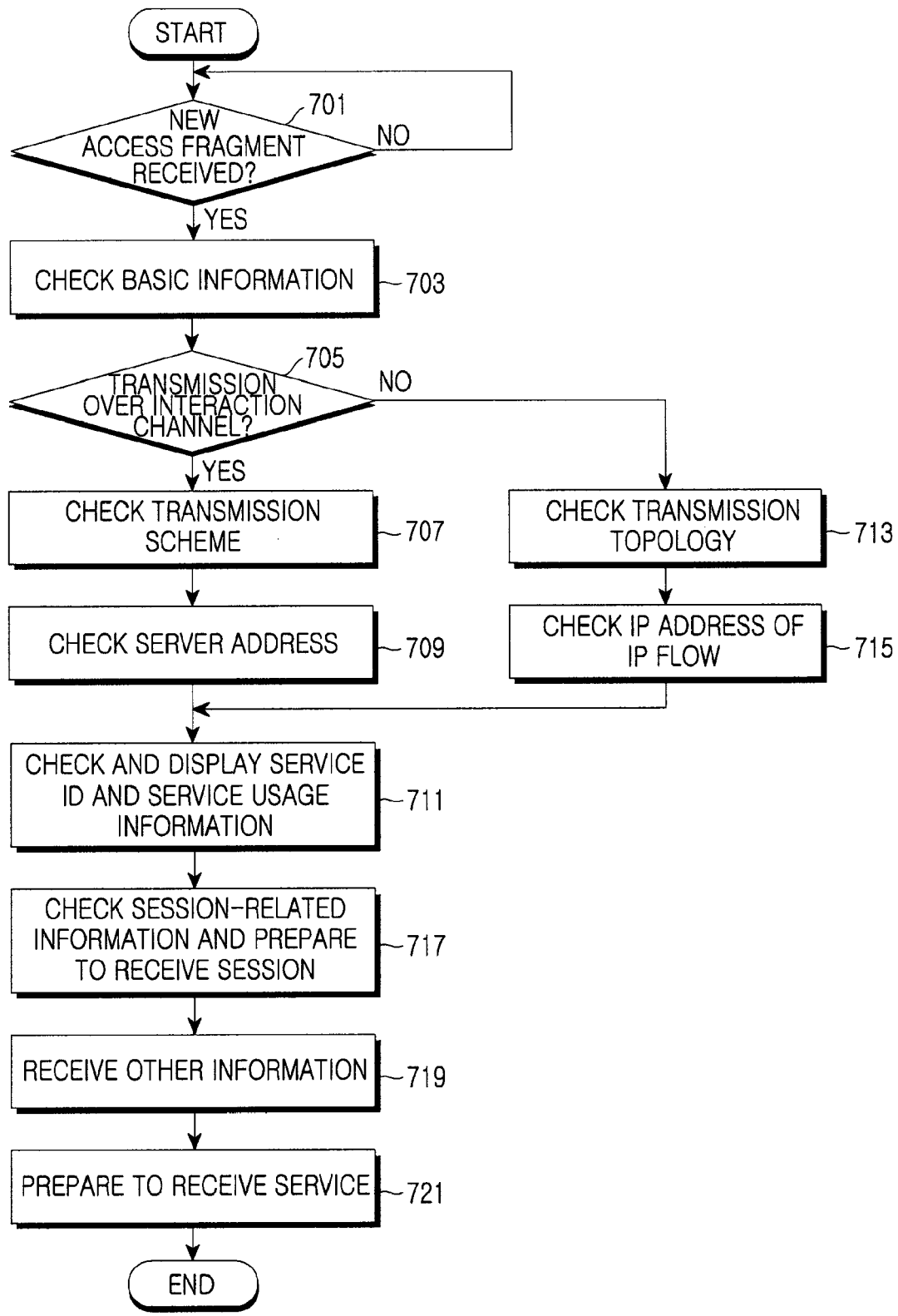
FIG. 7 is a flowchart illustrating a process of receiving and analyzing an access fragment in a broadcasting system according to the second exemplary embodiment of the present invention.

FIG. 7 is a flowchart illustrating a process of receiving and analyzing an access fragment in a broadcasting system according to the second embodiment of the present invention. This process corresponds to an operation of the access fragment analyzer 405 in the reception apparatus of FIG. 4.

Referring to FIG. 7, the access fragment analyzer 405 determines in step 701 whether there is any new access fragment received. The determination criteria is an attribute "version" of the received access fragment. If it is determined in step 701 that there is any access fragment received, the access fragment analyzer 405 analyzes, in step 703, the basic information of the access fragment, determines a valid period of the access fragment in the basic information, and recognizes that the information provided through the access fragment is valid only in the valid period. With the use of the basic information, the access fragment analyzer 405 determines whether the service provided by the access fragment underwent service protection before being transmitted. If the service underwent service protection, the access fragment analyzer 405 prepares to perform a related operation so that it can correctly receive the service provided through the corresponding access information. In addition, the access fragment analyzer 405 checks a basic attribute for the corresponding access information, and compares a performance condition of the mobile terminal required by the service based on the access information with a performance condition of the current mobile terminal to determine whether the service is receivable. Further, if there are several access fragments for the same service taking into account the bandwidth in the wireless channel where the service based on the access information is provided, the access fragment analyzer 405 can select an appropriate access fragment determined taking the performance of the mobile terminal into consideration, and receive the service according to the information provided from the access fragment.

In step 705, the access fragment analyzer 405 determines whether the access information for receiving at least one service is for the broadcast channel or the interaction channel. If the access information is for the interaction channel, the access fragment analyzer 405 proceeds to step 707. However, if access information is for the broadcast channel, the access fragment analyzer 405 proceeds to step 713.

In step 707, the access fragment analyzer 405 checks a transmission scheme and recognizes a communication system or protocol to be used. After recognizing that it should access the corresponding service using the determined communication system or protocol, the access fragment analyzer 405 analyzes, in step 709, an address of the server that provides the corresponding service over the interaction channel, and prepares to transmit a service request. The addressing system may differ according to communication system and protocol using the interaction channel.

Thereafter, in step 711, the access fragment analyzer 405 checks service usage information "UsageInfo" for at least one service that can be accessed with the access information, and if there is characteristic description for the access fragment and a plurality of access fragments for one service, or if there is one access fragment for a plurality of services, the access fragment analyzer 405 recognizes characteristic and correlation for each of them, and the mobile terminal displays the corresponding description for the user who will receive the service so as to allow the user to make an appropriate selection.

In step 713, the access fragment analyzer 405 checks the transmission topology, analyzes the information indicating whether the service will be transmitted in the broadcast mode or the multicast mode, and prepares to perform an operation appropriate for the analysis result. For the service transmitted in the broadcast mode, the mobile terminal can receive the corresponding service without joining in the service. However, for the service transmitted in the multicast mode, the mobile terminal preferably should perform a Join process for a multicast IP address group of an IP flow where the service is transmitted, in order to receive the service.

In step 715, the access fragment analyzer 405 checks an address of the IP flow from the access information with which access to the corresponding service is possible. The address of the IP flow is very important for the mobile terminal scheduled to receive a corresponding service in the process of distinguishing an IP address with which access to the service is possible. If the address of the IP flow is not provided, the mobile terminal preferably should perform an operation of receiving all IP flows transmitted through the broadcast channel and determining an IP address for the desired service. The address of the IP flow is connected to a communication bearer under an IP layer and indicates which communication bearer the mobile terminal should receive in order to receive the IP flow. The method may be different in each broadcast system providing the broadcast channel and departs from the scope of the present invention, so a detailed description thereof will be omitted.

After determining an address of the IP flow in step 715, the access fragment analyzer 405 proceeds to step 711 where it checks and displays a service ID and service usage information. In step 717, the access fragment analyzer 405 checks information on the session where the service(s), whose access information is provided from the access fragment, is transmitted, and allows the mobile terminal to prepare to receive the session where the service is actually transmitted. Thereafter, in step 719, the access fragment analyzer 405 analyzes the other information provided from the access fragment and uses the related information for an appropriate purpose. In step 721, the access fragment analyzer 405 prepares to access and receive the service according to the information analyzed from the access fragment, and then ends the operation.

Third Exemplary Embodiment

With reference to Table 19 to Table 37, a description will now be made of a method for providing access information for service transmission via a broadcast network and service transmission via an interaction network according to a third exemplary embodiment of the present invention.

As described in the first and second exemplary embodiments, the access fragment provides access information that the mobile terminal uses to have access to the service.

In Table 19 and Table 20 below, "Id", "version", "validFrom", and "validTo" indicate basic information of ID, version and valid period for the access fragment, respectively. In Table 20, "AccessType" comprises detailed access information of the broadcast network or interaction network for the service. In Table 26, "KeyManagementSystem" comprises information indicating during service access whether the corresponding service is encrypted or whether the corresponding content is encrypted, and also comprises information on the method used for the encryption. In Table 29, "AlternativeAccessURL" comprises information on an address, access to which is possible via the interaction network, in case the mobile terminal has difficulty in accessing the corresponding broadcast network when the "AccessType" of Table 20 comprises broadcast network information. The "TerminalCapabilityRequirement" in Table 30 and "BandwidthRequirement" in Table 35, indicate the requirement of the mobile terminal for having access to the corresponding service, and bandwidth information of the service, respectively.

In Table 35, "ServiceClass" indicates the purposes of using the corresponding access fragment, i.e. service guide reception, file transmission, stream transmission, and so forth. In Table 37, "NotificationReception" comprises address information for reception of notification messages.

The "AccessType" in Table 20 according to embodiments of the present invention will now be described in greater detail. The "AccessType" comprises detailed information for the service access. That is, the corresponding "AccessType" indicates whether it is access information for the broadcast network or access information for the interaction network according to "transmissionMedia" information in Table 20. If the "transmissionMedia" is access information for the broadcast network, the "AccessType" comprises only the "BroadcastServiceDelivery" information of Table 20, and if the "transmissionMedia" is access information for the interaction network, the "AccessType" comprises only the "UnicastServiceDelivery" information of Table 24.

In Table 20, the "transmissionMedia" used for distinguishing between the broadcast network and the interaction network can be optionally included in the "AccessType". Even when the "transmissionMedia" is not included, only one of the "BroadcastServiceDelivery" information of Table 20 for access to the broadcast network, and the "UnicastServiceDelivery" information of Table 24 for access to the interaction network, is included in the "AccessType", so the mobile terminal can determine whether it will have access to the broadcast network or the interaction network by determining which information is included in the "AccessType".

The "BroadcastServiceDelivery" information comprises detailed access information related to the broadcast network, and based on "bdsType" of Table 21, the mobile terminal can determine through which broadcast network the service is received. For example, if the "bdsType" has a value of 0, the mobile terminal is serviced through DVB-H IPDC, and the values specified in the "BroadcastServiceDelivery" comprise the detailed information that the mobile terminal uses to access the DVB-H IPDC and receive the service.

The "destinationIPAddress" in Table 21 denotes an IP address used for receiving the service via the broadcast network, and the mobile terminal accesses the corresponding address and receives the service. The corresponding address information is used when "SessionDescriptionReference" or SDP information of Table 22 is not included. When the "SessionDescriptionReference" or SDP is included, the mobile terminal checks the address value and detailed access information in the corresponding SDP information, and accesses the broadcast network.

The "UnicastServiceDelivery" in Table 24 denotes access information for the case where the mobile terminal receives the service via the interaction network. The detailed address information used by the mobile terminal to receive the service is specified in "AccessServerURL" of Table 24. In addition, "transmissionSchemeType" in Table 25 indicates a transport mechanism used for accessing the corresponding "AccessServerURL" and downloading the service, and the transport mechanism indicates information on HTTP, MMS, WAP, and so forth. For example, if the "transmissionSchemeType" is 0, the mobile terminal accesses the corresponding address "AccessServerURL" using the HTTP, and receives the service.

TABLE 19

| Name | Type | Category | Cardinality | Description | Data Type |
|---|---|---|---|---|---|
| Access | E | | | Access fragment Contains the following attributes: id version validFrom validTo Contains the following sub-elements: AccessType ServiceAccessNotificationURL KeyManagementSystem TerminalBindingKeyID ExtensionURL ServiceIDRef ScheduleReference UsageInfo AlternativeAccessURL TerminalCapabilityRequirement BandwidthRequirement ServiceClass PreviewDataIDRef NotificationReception | |
| Id | A | NM/TM | 1 | ID of the Access fragment, globally unique. | anyURI |

TABLE 19-continued

| Name | Type | Category | Cardinality | Description | Data Type |
|---|---|---|---|---|---|
| version | A | NM/TM | 1 | Version of this fragment. The newer version overrides the older one as soon as it has been received. | unsignedInt (32 bits) |
| validFrom | A | NO/TM | 0 . . . 1 | The first moment when this fragment is valid. If not given, the validity is assumed to have started at some time in the past. | int (32 bits). expressed as NTP time. |

TABLE 20

| | | | | | |
|---|---|---|---|---|---|
| validTo | A | NO/TM | 0 . . . 1 | The last moment when this fragment is valid. If not given, the validity is assumed to end in an undefined time in the future. | int (32 bits), expressed as NTP time. |
| AccessType | E1 | NM/TM | 1 | Defines the type of access. Contains the following Attribute: transmissionMedia Contains the following elements: BroadcastServiceDelivery UnicastserviceDelivery | |
| transmissionMedia | A | NM/TM | 1 | This attribute indicates which channel is used for the delivery of service. 0: Broadcast Channel 1: Interaction Channel | Boolean |
| BroadcastServiceDelivery | E2 | NO/TM | 0 . . . 1 | This element is used for the indication of IP transmission. This element may only be present when: TransmissionMedia == 0. Contains the following Attribute: bdsType destinationIPAddress Contains the following elements: SessionDescriptionReference SDP | |

TABLE 21

| | | | | | |
|---|---|---|---|---|---|
| bdsType | A | NO/TM | 0 . . . 1 | Identifier of the type of underlying distribution system that this access fragment relates to. This attribute may only be present when: TransmissionMedia == 0. Defined values 0: DVB-H IPDC 1. 3GPP MBMS Rel-6 2: 3GPP MBMS Rel-7 3: 3GPP2 BCMCS (1x) 4: 3GPP2 BCMCS (HRPD) 5: 3GPP2 Enhanced BCMCS (HRPD) 6-127: reserved for future use 128-255: reserved for proprietary use | unsignedByte |
| destinationIPAddress | A | NO/TM | 0 . . . 1 | DestinationIP address of IP stream, which transport A Service over Broadcast channel. Note: This attribute is used when SDP is not included in Access Fragment. If SDP in Access Fragment exists, IP address of the receiver IP address in SDP is used. | string |

TABLE 22

| | | | | |
|---|---|---|---|---|
| Session Description Reference | E3 | NO/TM | 0...N | The reference to the SessionDescription this access relates to.<br>Note: The SessionDescription itself may be delivered in two ways via broadcast or via fetch over interaction channel.<br>In the case of broadcast delivery, the SessionDescription fragment is either delivered in SGDU or encapsulated in this Access fragment. In the latter case the SDP element is used instead of the Session Description Reference.<br>If AuxiliaryDescription fragments are provided they are referenced by the SessionDescriptionReference.<br>In the case of fetch over interaction channel, the Session Description can be acquired by accessing the URI (given as attribute of this element).<br>Contains the following Attributes:<br>type<br>uri<br>idRef |

TABLE 23

| | | | | | |
|---|---|---|---|---|---|
| type | A | NM/TM | 1 | Type of the session description referred by this SessionDescriptionReference<br>0 - SDP<br>1 - MBMS User Service Description (MBMS-USD) as specified in [26.346] section 5.2. It may contain one or several SDP descriptions.<br>2 - AssociatedDeliveryProcedure for File Distribution<br>3 - AssociatedDeliveryProcedure for Stream Distribution<br>4-127 Reserved for future use<br>128-255 Reserved for proprietary use | unsignedByte |
| uri | A | NO/TM | 0...1 | The URI to the file containing SessionDescription that the media application in the terminal uses to access the service or the URI for associatedDeliveryProcedure for File and Stream Distribution. | anyURI |
| idRef | A | NO/TM | 0...1 | The id of the SessionDescription fragment this access refers to, globally unique. | anyURI |
| SDP | E3 | NO/TM | 0...1 | A session description in SDP (IETF session description protocol) format. | string |

TABLE 24

| | | | | | |
|---|---|---|---|---|---|
| UnicastServiceDelivery | E2 | NO/TM | 0...N | This element indicates which server and/or protocol is used for delivery of service over Interaction Channel.<br>This element may only be present when: TransmissionMedia == 1.<br>Contains the following elements:<br>AccessServerURL | |
| AccessServerURL | E3 | NO/TM | 0...N | Server URL from which the terminal can receive the service via the Interaction Network.<br>For example, AccessServerURL can be an HTTP URL pointing to downloadable content, or an RTSP URL pointing to a streaming server for starting a streaming session.<br>Contains the following Attribute:<br>transmissionSchemeType | anyURI |

TABLE 25

| | | | | | |
|---|---|---|---|---|---|
| transmissionSchemeType | A | NM/TM | 1 | Specifies transport mechanism that is used for this access.<br>0 - HTTP<br>1 - MMS<br>2 - WAP 1.0<br>3 - WAP 2.x<br>4 - RTP<br>5 - 3GPP-PSS (3GPP packet-switched streaming service)<br>6 - 3GPP2-MSS (3GPP2 multimedia streaming services)<br>7 - 3GPP CS videotelephony (3GPP Circuit Switched H324m call)<br>8 - FLUTE<br>9-127 Reserved for future use<br>128-255 Reserved for proprietary use<br>(Note: Other protocol or communication system may be added based on OMA Service interaction function). | unsignedByte |
| ServiceAccessNotificationURL | E1 | NO/TM | 0 . . . N | URL that the terminal may use to notify when it accesses (switches to) this service over this access. The terminal shall not use this URL for notification without user consent.<br>Note: This URL can for example be used for initiating server-managed channel switching in unicast transmission. | anyURI |

TABLE 26

| | | | | | |
|---|---|---|---|---|---|
| KeyManagementSystem | E1 | NO/TM | 0 . . . N | Identifies the type of Key Management System(s)(KMS) that can be used to contact the Rights Issuer and, for GBA, whether GBA_U is mandatory or whether either GBA_ME or GBA_U can be used.<br>Note that the Rights Issuer can support more than one KMS.<br>If KeyManagementSystem is not specified, it means no protection is applied.<br>Values:<br>oma-bcast-drm-pki<br>Indicates OMA DRM PKI (Public Key Infrastructure);<br>oma-bcast-gba_u-mbms<br>Indicates GBA_U 3GPP MBMS SKI (Symmetric Key Infrastructure);<br>oma-bcast-gba_me-mbms<br>Indicates GBA_ME 3GPP MBMS SKI i.e. either GBA_ME or GBA_U can be used;<br>oma-bcast-gba_u-bcmcs<br>Indicates GBA_U 3GPP2 BCMCS SKI;<br>oma-bcast-gba_me-bcmcs<br>Indicates GBA_ME 3GPP2 BCMCS SKI i.e. either GBA_ME or GBA_U can be used;<br>oma-bcast-prov-bcmcs<br>Indicates provisioned 3GPP2 BCMCS SKI.<br>Contains the following Attributes:<br>ProtectionType<br>RightsIssuerURI | |

TABLE 27

| | | | | | |
|---|---|---|---|---|---|
| ProtectionType | A | NM/TM | 1 . . . 2 | Specifies the protection type offered by the KMS.<br>Values:<br>1 Content protection only<br>2 Service protection only<br>3 Both Content protection and Service Protection<br>4 Use of terminal binding (smartcard profile only)<br>5-127 Reserved for future use<br>128-255 Reserved for proprietary use | unsignedByte (8 bits) |
| RightsIssuerURI | A | NM/TM | 1 | Specifies the RightsIssuer URI. | anyURI |
| TerminalBindingKeyID | E1 | NO/TM | 1 | Number identifying the Terminal Binding Key ID (TBK ID) that is needed to access the service.<br>It is TM for terminals with the smartcard profile.<br>It does not apply to the DRM profile.<br>Contains the following optional Attribute:<br>RightsIssuerURI | int (32 bits) |
| RightsIssuerURI | A | NO/TM | 0 . . . 1 | Specifies the RightsIssuer URI for the TerminalBindingKey if it is different to the | anyURI |

TABLE 27-continued

RightsIssuerURI indicated in the
KeyManagementSystem element.
i.e. If the attribute is not present, the same
RightsIssuerURI is used to acquire both
SEK/PEK and TerminalBindingKey.

TABLE 28

| | | | | | |
|---|---|---|---|---|---|
| ServiceIDRef | E1 | NO/TM | 0 . . . N | Reference to the service fragment(s) to which the access fragment belongs. Either one of the ServiceIDRef or ScheduleIDRef but not both shall be instantiated. Note: Implementation in XML Schema using <choice>. Each Service fragment shall be associated to at least one Access fragment to enable the terminal to access the Service. | anyURI |
| ScheduleReference | E1 | NM/TM | 0 . . . N | Reference to the schedule fragment(s) to which the access fragment belongs. This provides a reference to a Schedule fragment to temporarily override the default Access fragment of the Service addressed by the Schedule. Either one of ServiceIDRef or ScheduleIDRef but not both shall be instantiated. Note: Implementation in XML Schema using <choice>. Contains Attribute: idRef Contains sub-element: DistributionWindowID | |

TABLE 29

| | | | | | |
|---|---|---|---|---|---|
| idRef | A | NM/TM | 1 | Identification of the Schedule fragment which the Access fragment relates to. | anyURI |
| DistributionWindowID | E2 | NO/TM | 0 . . . N | Relation reference to the DistributionWindowID to which the access fragment belongs. The DistributionWindowIDs declared in this element shall be the complete collection or a subset of the DWids declared in the Schedule fragment, to which "idRef" reference belongs. | integer |
| UsageInfo | E1 | NO/TM | 0 . . . N | This text helps the user understand what difference it makes to use one or the other access fragment. It 'is mandatory in case more than one access fragment is available at a given point in time. Possibly provided in multiple languages. The language is expressed using built-in XML attribute xml:lang with this element. | string |
| AlternativeAccessURL | E1 | NO/TM | 0 . . . N | Specify alternative URL of the content for retrieving it via the interaction channel (e.g. if the content cannot be received via the broadcast channel). | anyURI |

TABLE 30

| | | | | |
|---|---|---|---|---|
| TerminalCapability Requirement | E1 | NO/TM | 0 . . . 1 | Terminal capabilities required to consume the service or content. For video and audio, the media type and the related type attributes in the SDP (see section 5.1.2.5) signal the audio/video decoder. This way, these parameters complement the TerminalCapabilityRequirement. Additionally, the complexities of the audio/video streams are described here if they differ from the complexities which can be derived from the media type attributes in the SDP (e.g. level). In this case, the parameters defined in the Access fragment take priority. |

TABLE 30-continued

Sub-elements:
Video
Audio
DownloadFile

TABLE 30-continued

| | | | | |
|---|---|---|---|---|
| Video | E2 | NO/TM | 0...1 | Video codec capability related requirements<br>Sub-elements:<br>Complexity |

TABLE 31

| | | | | | |
|---|---|---|---|---|---|
| Complexity | E3 | NO/TM | 0...1 | The complexity the video decoder has to deal with. It is recommended that this element is included if the complexity indicated by the MIME type parameters in the SDP differs from the actual complexity.<br>Sub-elements:<br>Bitrate<br>Resolution<br>MinimumBufferSize | |
| Bitrate | E4 | NO/TM | 0...1 | The total bit-rate of the video stream.<br>Attributes:<br>average<br>maximum | |
| average | A | NO/TM | 0...1 | The average bit-rate in kbits/sec | unsigned Short (16 bits) |
| maximum | A | NO/TM | 0...1 | The maximum bit-rate in kbits/sec | unsigned Short (16 bits) |

TABLE 32

| | | | | | |
|---|---|---|---|---|---|
| Resolution | E4 | NO/TM | 0...1 | The resolution of the video.<br>Attributes:<br>horizontal<br>vertical | |
| horizontal | A | NM/TM | 1 | The horizontal resolution of the video. | unsignedShort (16 bits) |
| vertical | A | NM/TM | 1 | The vertical resolution of the video. | unsignedShort (16 bits) |
| Minimum BufferSize | E4 | NO/TM | 0...1 | The minimum decoder buffer size required to process the video content in kbytes. | unsignedInt (32 bits) |
| Audio | E2 | NO/TM | 0...1 | The audio codec capability.<br>Sub-elements:<br>Complexity | |

TABLE 33

| | | | | | |
|---|---|---|---|---|---|
| Complexity | E3 | NO/TM | 0...1 | The complexity the audio decoder has to deal with. It is recommended that this element is included if the complexity indicated by the MIME type parameters in the SDP differs from the actual complexity.<br>Sub-elements:<br>Bitrate<br>MinimumBufferSize | |
| Bitrate | E4 | NO/TM | 0...1 | The total bit-rate of the audio stream.<br>Attributes:<br>average<br>maximum | |
| average | A | NO/TM | 0...1 | The average bit-rate in kbits/sec. | unsignedShort (16 bits) |
| maximum | A | NO/TM | 0...1 | The maximum bit-rate in kbits/sec. | unsignedShort (16 bits) |
| MinimumBuff-erSize | E4 | NO/TM | 0...1 | The minimum decoder buffer size required to process the video content in kbytes. | unsignedInt (32 bits) |

TABLE 34

| | | | | | |
|---|---|---|---|---|---|
| DownloadFile | E2 | NO/TM | 0 . . . 1 | The required capability for the download files.<br>Sub-elements:<br>MIMETypeSet | |
| MIMETypeSet | E3 | NO/TM | 0 . . . N | Assuming a download service consists of a set of files with different MIME types which together make up the service, the terminal must support all of these MIME types in order to be able to present the service to the user.<br>A MIMETypeSet lists all of these MIME types. If a terminal does not support one or more of the MIME types, it will probably not be able to present the service.<br>Sub-elements:<br>Type | |
| Type | E4 | NO/TM | 0 . . . N | One MIME type in the MIMETypeSet. The format of this string shall follow the Content-type syntax in [RFC 2045].<br>Contains the following Attributes:<br>Codec | string |

TABLE 35

| | | | | | |
|---|---|---|---|---|---|
| Codec | A | NO/TM | 0 . . . 1 | The codec parameters for the associated MIME Media type. If the file's MIME type definition specifies mandatory parameters, these must be included in this string. Optional parameters containing information that can be used to determine as to whether the terminal can make use of the file should be included in the string. One example of the parameters defined for audio/3GPP, audio/3GPP2, video/3GPP, video/3GPP2 is specified in [RFC4281]. | string |
| BandwidthRequirement | E1 | NO/TM | 0 . . . 1 | Specification of required network bandwidth to access described in this fragment;<br>A broadcast service can include multiple accessible streams (same content) with different bandwidth, so that the terminal can make a choice depending on its current reception condition. | integer |
| ServiceClass | E1 | NM/TM | 1 . . . N | The ServiceClass identifies the class of service. This identification is more detailed than the type attribute in the service fragment and allows the association of service/access combination to specific applications. | string |

TABLE 36

| | | | | | |
|---|---|---|---|---|---|
| PreviewData IDRef | E1 | NO/TM | 0 . . . N | Reference to the PreviewData fragment which specifies an icon, pictogramme, animation or audio.<br>Attribute:<br>usage | anyURI |
| usage | A | NM/TM | 1 | Possible values:<br>0. unspecified<br>1. background<br>2. icon/logo<br>3. poster<br>4. trailer<br>5. barker<br>6. service/channel zapping<br>7-127. reserved for future use<br>128-255. reserved for proprietary use<br>Note: only usage = 6 (service/channel zapping) is the valid value when the preview data is associated with Access fragment. | unsignedByte (8 bits) |

TABLE 37

| | | | | | |
|---|---|---|---|---|---|
| Notification Reception | E1 | NO/TM | 0 . . . 1 | Reception information for Notification Messages.<br>NotificationPort is mandatory because a designated UDP Port shall be used to deliver the notification message through an on-going session or the designated session while NotificationAddress is optionally used for the delivery of Notification Messages through the designated multicast or broadcast session.<br>Contains the following attributes:<br>NotificationPort | |

TABLE 37-continued

| | | | | | |
|---|---|---|---|---|---|
| | | | | NotificationAddress NotificationRequestURL NotificationPollURL | |
| Notification Port | A | NO/TM | 0 . . . 1 | Service-specific Notification Message delivery UDP Port number. | integer |
| Notification Address | A | NO/TM | 0 . . . 1 | Service-specific Notification Message delivery IP multicast address. Note: If Notification Message is delivered over interaction channel, this attribute should be combined with NotificationPort. | string |
| Notification RequestURL | A | NO/TM | 0 . . . 1 | URL through which the terminal can subscribe to service-specific Notification Messages. | anyURI |
| Notification PollURL | A | NO/TM | 0 . . . 1 | URL through which the terminal can poll service-specific Notification Messages. | anyURI |
| <proprietary elements/ attributes> | E1 or lower, A | NO/TO | 0 . . . N | Any number of proprietary or application-specific elements or attributes that are not defined in this specification. | |

As can be understood from the foregoing description, embodiments of the present invention can provide detailed access information of the broadcast network or the interaction network, via which the broadcast service is transmitted, in the broadcasting system providing IP-based broadcast services.

Embodiments of the present invention can provide detailed access information of the broadcast network or the interaction network, via which the service is transmitted to the mobile terminal, by providing an efficient access fragment format in the broadcasting system providing IP-based broadcast services.

Further, embodiments of the present invention can provide an efficient access fragment format when accessing a plurality of services through one access fragment.

In addition, embodiments of the present invention provide an access fragment transmission/reception method and apparatus for efficiently supporting the transmission scheme/transmission topology and protocol for each individual channel over which the service is transmitted, in the process of configuring Access Type of the access fragment, thereby allowing the mobile terminal to efficiently access the service.

Moreover, embodiments of the present invention provide IP multicast transmission information to the mobile terminal in the broadcasting system requiring a high data rate, contributing to a reduction in the wireless resources.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting access information of a broadcast service in a transmitter of a broadcasting system, the method comprising:
   generating the access information comprising an access type for indicating either a broadcast delivery mode or a unicast delivery mode, by which the broadcast service is transmitted; and
   transmitting a service guide provided for the broadcast service to a terminal,
   wherein the access information is included in an access fragment and the access fragment is transmitted through the service guide provided for the broadcast service.

2. The method of claim 1, wherein when the broadcast service is provided by the broadcast delivery mode, the access information comprises an Internet protocol (IP) address for access to the broadcast service.

3. The method of claim 2, wherein the IP address comprises either a multicast IP address or a broadcast IP address.

4. The method of claim 1, wherein when the access information comprises a session description protocol (SDP), an IP address in the SDP is used as an IP address for access to the broadcast service.

5. The method of claim 1, wherein when the broadcast service is provided by the unicast delivery mode, the access information comprises address information of a server for access to the broadcast service.

6. The method of claim 5, wherein the address information of the server is provided to the terminal using at least one of multimedia messaging service (MMS) and short messaging service (SMS).

7. The method of claim 1, wherein the broadcasting system comprises an IP-based broadcasting system.

8. The method of claim 1, wherein the access information further comprises information indicating a network by which the broadcast service is provided, by either the broadcast delivery mode or the unicast delivery mode.

9. The method of claim 1, wherein the access information further comprises at least one of requirement information for a capability of the terminal receiving the broadcast service and bandwidth information of the broadcast service.

10. The method of claim 1, wherein there is a plurality of access information for one broadcast service.

11. The method of claim 1, wherein the broadcasting system comprises an Open Mobile Alliance browser and content mobile broadcast (OMA BCAST) system.

12. An apparatus for transmitting access information of a broadcast service in a broadcasting system, the apparatus comprising:
   at least one processor; and
   a transmitter coupled to the at least one processor,
   wherein the at least one processor is configured to generate the access information comprising an access type for indicating either a broadcast delivery mode or a unicast delivery mode, by which the broadcast service is transmitted,
   wherein the transmitter is configured to transmit a service guide provided for the broadcast service, and
   wherein the access information is included in an access fragment and the access fragment is transmitted through the service guide provided for the broadcast service.

13. The apparatus of claim 12, wherein when the broadcast service is provided by the broadcast delivery mode, the access information comprises an internet protocol (IP) address for access to the broadcast service.

14. The apparatus of claim 13, wherein the IP address comprises either a multicast IP address or a broadcast IP address.

15. The apparatus of claim 12, wherein when the access information comprises a session description protocol (SDP), an IP address in the SDP is used as an IP address for access to the broadcast service.

16. The apparatus of claim 12, wherein when the broadcast service is provided by the unicast delivery mode, the access information comprises address information of a server for access to the broadcast service.

17. The apparatus of claim 16, wherein the address information of the server is provided to a terminal using at least one of multimedia messaging service (MMS) and short messaging service (SMS).

18. The apparatus of claim 16, wherein the broadcasting system comprises an IP-based broadcasting system.

19. The apparatus of claim 12, wherein the access information further comprises information indicating a network by which the broadcast service is provided, by either the broadcast delivery mode or the unicast delivery mode.

20. The apparatus of claim 12, wherein the access information further comprises at least one of requirement information for a capability of a terminal receiving the broadcast service and bandwidth information of the broadcast service.

21. The apparatus of claim 12, wherein there is a plurality of access information for one broadcast service.

22. The apparatus of claim 12, wherein the broadcasting system comprises an Open Mobile Alliance browser and content mobile broadcast (OMA BCAST) system.

23. A method for receiving access information of a broadcast service in a terminal of a broadcasting system, the method comprising:
  receiving a service guide comprising the access information provided for the broadcast service; and
  receiving the broadcast service by either a broadcast delivery mode or a unicast delivery mode based on the received access information comprising an access type for indicating either the broadcast delivery mode or the unicast delivery mode, by which the broadcast service is transmitted,
  wherein the access information received through the service guide is included in an access fragment.

24. The method of claim 23, further comprising:
  determining a network by which the broadcast service is transmitted, by either the broadcast delivery mode or the unicast delivery mode according to the received access information; and
  setting an access address for reception of the broadcast service.

25. The method of claim 24,
  wherein when the broadcast service is provided by the broadcast delivery mode, the access information comprises an internet protocol (IP) address for access to the broadcast service, and
  wherein the setting step comprises the step of setting the access address as the IP address.

26. The method of claim 24,
  wherein when the access information comprises session description protocol (SDP), an IP address in the SDP is used as an IP address for access to the broadcast service, and
  wherein the setting step comprises the step of setting the access address as the IP address in the SDP.

27. The method of claim 24, wherein the IP address comprises either a multicast IP address or a broadcast IP address.

28. The method of claim 24,
  wherein when the broadcast service is provided by the unicast delivery mode, the access information comprises address information of a server for access to the broadcast service, and
  wherein the setting step comprises the step of setting the access address as the address information of the server for access to the broadcast service.

29. The method of claim 28, further comprising:
  receiving the address information of the server through at least one of multimedia messaging service (MMS) and short messaging service (SMS).

30. The method of claim 23, wherein the broadcasting system comprises an IP-based broadcasting system.

31. The method of claim 23, wherein the access information further comprises information indicating a network by which the broadcast service is provided, by either the broadcast delivery mode or the unicast delivery mode.

32. The method of claim 23,
  wherein the access information further comprises at least one of requirement information for a capability of the terminal receiving the broadcast service and bandwidth information of the broadcast service, and
  wherein the terminal achieves access to the broadcast service based on at least one of the requirement information and the bandwidth information.

33. The method of claim 23, wherein there is a plurality of access information for one broadcast service.

34. The method of claim 23, wherein the broadcasting system comprises an Open Mobile Alliance browser and content mobile broadcast (OMA BCAST) system.

35. An apparatus for receiving access information of a broadcast service in a terminal of a broadcasting system, the apparatus comprising:
  at least one processor; and
  a receiver coupled to the at least one processor, and the receiver configured to:
    receive a service guide comprising the access information provided for the broadcast service, and
    receive the broadcast service by either a broadcast delivery mode or a unicast delivery mode based on the received access information comprising an access type for indicating either the broadcast delivery mode or the unicast delivery mode, by which the broadcast service is transmitted,
  wherein the access information received through the service guide is included in an access fragment.

36. The apparatus of claim 35,
  wherein the receiver is further configured to:
    determine a network by which the broadcast service is transmitted, by either the broadcast delivery mode or the unicast delivery mode according to the received access information, and
    set an access address for reception of the broadcast service.

37. The apparatus of claim 36,
  wherein when the broadcast service is provided by the broadcast delivery mode, the access information comprises an internet protocol (IP) address for access to the broadcast service, and
  wherein the receiver is further configured to set the access address as the IP address.

38. The apparatus of claim 36,
wherein when the access information comprises session description protocol (SDP), an IP address in the SDP is used as an IP address for access to the broadcast service, and
wherein the receiver is further configured to set the access address as the IP address in the SDP.

39. The apparatus of claim 36, wherein the IP address comprises either a multicast IP address or a broadcast IP address.

40. The apparatus of claim 36,
wherein when the broadcast service is provided by the unicast delivery mode, the access information comprises address information of a server for access to the broadcast service, and
wherein the receiver is further configured to set the access address as the address information of the server for access to the broadcast service.

41. The apparatus of claim 40, wherein the receiver is further configured to analyze the access information and then receive the address information of the server through at least one of multimedia messaging service (MMS) and short messaging service (SMS).

42. The apparatus of claim 35, wherein the broadcasting system comprises an IP-based broadcasting system.

43. The apparatus of claim 35, wherein the access information further comprises information indicating a network by which the broadcast service is provided, by either the broadcast delivery mode or the unicast delivery mode.

44. The apparatus of claim 36,
wherein the access information further comprises at least one of requirement information for a capability of the terminal receiving the broadcast service and bandwidth information of the broadcast service, and
wherein the receiver is further configured to achieve access to the broadcast service based on at least one of the requirement information and the bandwidth information.

45. The apparatus of claim 35, wherein there is a plurality of access information for one broadcast service.

46. The apparatus of claim 35, wherein the broadcasting system comprises an Open Mobile Alliance browser and content mobile broadcast (OMA BCAST) system.

\* \* \* \* \*